US011416139B2

(12) United States Patent
Kim et al.

(10) Patent No.: US 11,416,139 B2
(45) Date of Patent: Aug. 16, 2022

(54) ELECTRONIC DEVICE AND SCREEN DISPLAY METHOD OF ELECTRONIC DEVICE

(71) Applicant: Samsung Electronics Co., Ltd., Suwon-si (KR)

(72) Inventors: Soyoung Kim, Suwon-si (KR); Daehyun Kim, Hwaseong-si (KR); Minsik Kim, Yongin-si (KR); Jongmoo Lee, Seoul (KR); Geon-Soo Kim, Suwon-si (KR); Jin-Wan An, Daegu (KR); Ji-Woo Lee, Gumi-si (KR); Hyun-Suk Choi, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 129 days.

(21) Appl. No.: 16/492,332

(22) PCT Filed: Jan. 25, 2018

(86) PCT No.: PCT/KR2018/001103
§ 371 (c)(1),
(2) Date: Sep. 9, 2019

(87) PCT Pub. No.: WO2018/164372
PCT Pub. Date: Sep. 13, 2018

(65) Prior Publication Data
US 2021/0132790 A1    May 6, 2021

(30) Foreign Application Priority Data

Mar. 8, 2017   (KR) ........................ 10-2017-0029584

(51) Int. Cl.
*G06F 3/04886*   (2022.01)
*G06F 3/01*   (2006.01)
(Continued)

(52) U.S. Cl.
CPC .......... *G06F 3/04886* (2013.01); *G06F 3/016* (2013.01); *G06F 3/041* (2013.01);
(Continued)

(58) Field of Classification Search
CPC ...... G06F 3/04886; G06F 3/016; G06F 3/041; G06F 3/0484; G06F 3/14; G06F 3/16
See application file for complete search history.

(56) References Cited

U.S. PATENT DOCUMENTS 10,101,878 B2 *  10/2018  Mitchell .............. G06F 3/0482
2009/0046075 A1   2/2009  Kim et al.
(Continued)

FOREIGN PATENT DOCUMENTS

KR   10-2009-0017901    2/2009
KR   10-2010-0032660    3/2010
(Continued)

OTHER PUBLICATIONS

International Search Report for PCT/KR2018/001103 dated May 1, 2018, 4 pages.
(Continued)

*Primary Examiner* — James T Tsai
(74) *Attorney, Agent, or Firm* — Nixon & Vanderhye, P.C.

(57) ABSTRACT

Provided are an electronic device and a screen display method of the electronic device. More specifically, provided are an electronic device for providing an extension function to a second area according to a characteristic of a characteristic area in first and second areas of an extended touch screen, and a screen display method of the electronic device. Some of the disclosed embodiments provide an electronic device for providing an extension function to a second area according to a characteristic of a characteristic area of an application screen in first and second areas divided by a (Continued)

trigger in an extended touch screen. In addition thereto, various other embodiments are also possible.

14 Claims, 20 Drawing Sheets

(51) Int. Cl.
*G06F 3/041* (2006.01)
*G06F 3/0484* (2022.01)
*G06F 3/14* (2006.01)
*G06F 3/16* (2006.01)

(52) U.S. Cl.
CPC .............. *G06F 3/0484* (2013.01); *G06F 3/14* (2013.01); *G06F 3/16* (2013.01)

(56) References Cited

U.S. PATENT DOCUMENTS

| | | | |
|---|---|---|---|
| 2010/0066698 A1 | 3/2010 | Seo | |
| 2010/0248788 A1 | 9/2010 | Yook et al. | |
| 2012/0303268 A1 | 11/2012 | Su et al. | |
| 2013/0120293 A1* | 5/2013 | Jeon | G06F 3/01 345/173 |
| 2013/0263002 A1* | 10/2013 | Park | G06F 16/7867 715/719 |
| 2014/0365901 A1* | 12/2014 | Moha | H04W 4/00 715/738 |
| 2015/0094910 A1 | 4/2015 | Bassier et al. | |
| 2015/0220218 A1* | 8/2015 | Jeon | G06F 3/0488 715/825 |
| 2015/0309720 A1* | 10/2015 | Fisher | G06F 3/04842 715/752 |
| 2016/0048298 A1* | 2/2016 | Choi | H04W 4/02 715/846 |
| 2017/0017355 A1* | 1/2017 | Lim | G06F 3/0488 |
| 2017/0205990 A1* | 7/2017 | Ma | G06F 3/04817 |
| 2017/0255314 A1 | 9/2017 | Choi | |
| 2018/0181286 A1* | 6/2018 | McKay | G06F 3/0486 |
| 2019/0244586 A1 | 8/2019 | Hyun et al. | |

FOREIGN PATENT DOCUMENTS

| | | |
|---|---|---|
| KR | 10-2010-0107377 | 10/2010 |
| KR | 10-2017-0097523 | 8/2017 |
| KR | 10-2017-0102681 | 9/2017 |
| WO | 2014/171963 | 10/2014 |

OTHER PUBLICATIONS

Written Opinion of the ISA for PCT/KR2018/001103 dated May 1, 2018, 6 pages.

Notice of Preliminary Rejection dated Mar. 23, 2021 in counterpart Korean Patent Application No. KR10-2017-0029584 and English-language translation.

Notice of Patent Grant dated Sep. 8, 2021 in counterpart Korean Patent Application No. KR10-2017-0029584 and English-language translation.

* cited by examiner

ELECTRONIC DEVICE AND SCREEN DISPLAY METHOD OF ELECTRONIC DEVICE

This application is the U.S. national phase of International Application No. PCT/KR2018/001103, filed on Jan. 25, 2018 which designated the U.S. and claims priority to Korean Patent Application No. 10-2017-0029584, filed on Mar. 8, 2017, the entire contents of each of which are hereby incorporated by reference.

FIELD

Various embodiments of the disclosure relate to an electronic device and a screen display method of the electronic device, and in particular, to an electronic device for displaying an extension function in an extended screen area according to a characteristic of a characteristic area adjacent to an application screen executed in the electronic device having the extended screen area, and a screen display method of the electronic device.

BACKGROUND ART

With the technical advancement, the electronic device can provide not only telephony and data transmission but also multitasking or various services and functions through various applications.

A screen size of an electronic device has been increased, and a bezel width has gradually been decreased. An increased home screen or an increased application screen may be displayed according to an increased screen size in the electronic device. A user may need a screen display method suitable for the increased screen size.

SUMMARY

Various embodiments of the disclosure propose an electronic device for displaying an extension function in an extended screen area according to a characteristic of a characteristic area adjacent to an application screen executed in the electronic device, and a screen display method of the electronic device.

An electronic device according to an embodiment of the disclosure includes an extended touch screen which displays an application screen and a processor which controls the touch screen. The processor divides the extended touch screen into a first area and a second area in response to a user input, and provides a feedback corresponding to an extension function of a characteristic area to the second area according to a determined characteristic of the characteristic area between the first area and the second area.

According to an aspect of the disclosure, the extended touch screen may be implemented by extending a vertical rate of an aspect ratio of a touch screen before being extended.

According to an aspect of the disclosure, the processor may provide a different feedback according to the characteristic of the characteristic area.

A screen display method of an electronic device according to an embodiment of the disclosure includes displaying an application screen on an extended touch screen, dividing the extended touch screen into a first area and a second area in response to a user input, and providing a feedback corresponding to an extension function of the characteristic area to the second area according to the determined characteristic. When the feedback is provided to the second area, a part of the application screen may be displayed on the first area.

According to an aspect of the disclosure, the characteristic may be determined through an identification of the characteristic area.

According to an aspect of the disclosure, the second area may be located at one of an upper end and lower end of the extended touch screen.

DETAILED DESCRIPTION OF EXAMPLE EMBODIMENTS

Figure 1A:
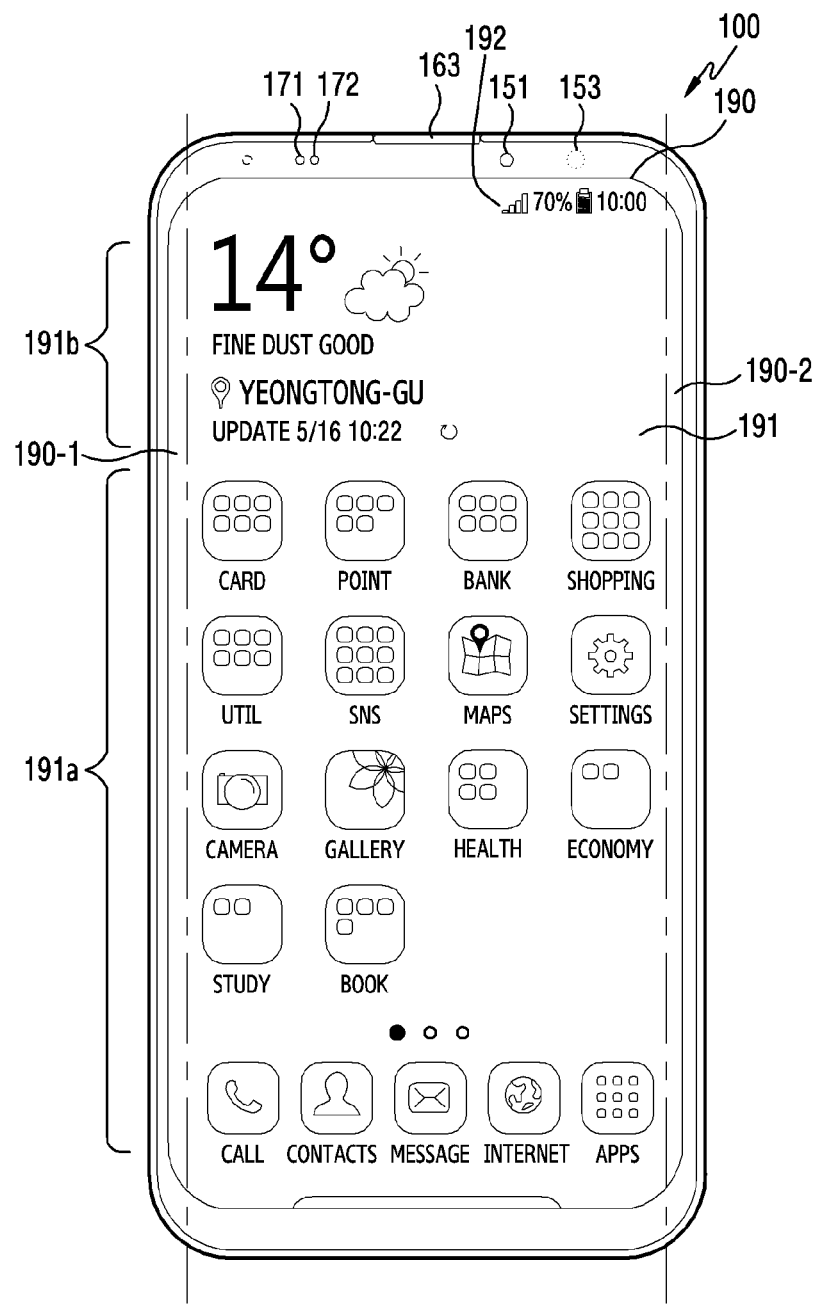
FIG. 1A is a schematic view illustrating an electronic device according to various embodiments of the disclosure.

Various example embodiments of the present disclosure are described in greater detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms used herein are defined in consideration of functions of the present disclosure and may vary depending on a user's or an operator's intention and usage. Therefore, the terms used herein should be understood based on the descriptions made herein. It is to be understood that the singular forms "a," "an," and "the" include plural referents unless the context clearly dictates otherwise. In the present disclosure, an expression such as "A or B," "at least one of A and B," or "one or more of A and B" may include all possible combinations of the listed items. Expressions such as "first," "second," "primarily," or "secondary," as used herein, may represent various elements regardless of order and/or importance, and do not limit corresponding elements. The expressions may be used for distinguishing one element from another element, but do not imply a temporal relationship. When it is described that an element (such as a first element) is operatively or communicatively "coupled to" or "connected to" another element (such as a second element), the element can be directly connected to the other element or can be connected through another element (such as a third element).

The expression "configured to (or set)", as used in the present disclosure, may be used interchangeably with, for example, "suitable for," "having the capacity to," "designed to," "adapted to," "made to," or "capable of" according to the situation. The term "configured to (or set)" does not only refer to "specifically designed to" by hardware. Alternatively, in some situations, the expression "apparatus configured to" may refer to a situation in which the apparatus "can" operate together with another apparatus or component. For example, the phrase "a processor configured (or set) to perform A, B, and C" may be, for example, and without limitation, a dedicated processor, a generic-purpose processor (such as a central processing (CPU) or an application processor (AP)) that can perform a corresponding operation by executing at least one software program stored at an exclusive processor (such as an embedded processor) for performing a corresponding operation or at a memory device.

An electronic device, according to embodiments of the present disclosure, may be embodied as, for example, at least one of a smart phone, a tablet PC, a mobile phone, a video phone, an e-book reader, a desktop PC, a laptop PC, a notebook computer, a workstation, a server, a PDA, a portable multimedia player (PMP), an MPEG 3 (MP3) player, medical equipment, a camera, and a wearable device, or the like, but is not limited thereto. The wearable device can include at least one of an accessory type (e.g., a watch, a ring, a bracelet, an ankle bracelet, a necklace, glasses, a contact lens, or a head-mounted-device (HMD)), a fabric or clothing embedded type (e.g., electronic garments), a body attachable type (e.g., a skin pad or a tattoo), and an implantable circuit, or the like, but is not limited thereto. The electronic device may be embodied as at least one of, for example, a television, a digital versatile disc (DVD) player, an audio device, a refrigerator, an air-conditioner, a cleaner, an oven, a microwave oven, a washing machine, an air cleaner, a set-top box, a home automation control panel, a security control panel, a media box, an electronic dictionary, an electronic key, a camcorder, and an electronic frame, or the like, but is not limited thereto.

In another embodiment, the electronic device may be embodied as at least one of various medical devices (such as, various portable medical measuring devices (a blood sugar measuring device, a heartbeat measuring device, a blood pressure measuring device, or a body temperature measuring device), a magnetic resonance angiography (MRA) device, a magnetic resonance imaging (MRI) device, a computed tomography (CT) device, a scanning machine, and an ultrasonic wave device), a navigation device, a global navigation satellite system (GNSS), an event data recorder (EDR), a flight data recorder (FDR), a vehicle infotainment device, electronic equipment for ship (such as, a navigation device for ship and gyro compass), avionics, a security device, a head unit for a vehicle, an industrial or home robot, a drone, an automated teller machine (ATM) of a financial institution, a point of sales (POS) device of a store, and an Internet of things (IoT) device (e.g., a light bulb, various sensors, a sprinkler device, a fire alarm, a thermostat, a street light, a toaster, sports equipment, a hot water tank, a heater, and a boiler), or the like, but is not limited thereto.

According to an embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device), or the like, but is not limited thereto. An electronic device, according to an embodiment, can be a flexible electronic device or a combination of two or more of the foregoing various devices. An electronic device is not limited to the foregoing devices may be embodied as a newly developed electronic device. The term "user", as used herein, can refer to a person using an electronic device or a device using an electronic device (e.g., an artificial intelligence electronic device).

An application according to various embodiments of the disclosure implies software executed on an Operating System (OS) or a mobile OS and used by a user. For example, the application may include a web browser, a camera application, a mobile payment application (or an electronic payment application, a payment application), a photo album application, a word processor, a spread sheet, a contacts application, a calendar application, a memo application, an alarm application, a Social Network System (SNS) application, a call application, a game store, a game application, a chatting application, a map application, a music player, a video player, or the like.

The application according to various embodiments of the disclosure may imply software executed on the electronic device or an external device (e.g., a wearable device, a server, etc.) coupled with the electronic device in a wireless or wired manner. In addition, the application according to various embodiments may imply software executed on the electronic device in response to a received user input.

Content may be executed or displayed through an application which is executed correspondingly. For example, included may be a video file or audio file reproduced in a video player which is one of the applications, a game file executed in a game application, a music file reproduced in a music player, a photo file displayed in a photo album application, a web page file displayed on a web browser, payment information (e.g., a mobile card number, a payment amount, a product name, a service name, or a shop name, etc.) displayed in an electronic payment application, or the like. In addition, the content may include a call screen (e.g., a caller ID, a caller name, a call start time, or a caller video (or caller image) based on a video call) displayed in the call application.

The content may include an application screen to be executed and a user interface constituting the application screen. In addition, the content may include one content or multiple contents.

A widget implies a mini application which is one of Graphic User Interfaces (GUIs) for more smoothly supporting interactions between the user and the application or the OS. Examples thereof include a weather widget, a calculator widget, a clock widget, or the like.

In various embodiments of the disclosure, a "user input" may be used as a terminology including, for example, aa user's button (or key) selection, a user's button (or key) press (or click), a user's soft button (or soft key) touch, a touch (or including non-contact such as hovering) received (or detected) on a touch screen by a user, a user's voice, a user's presence (e.g., presence of a user within a camera recognition range), or a user's motion. In addition, a "button (or key) selection" may be used as a terminology implying a button (or key) press (or click) or a soft button (or soft key) touch.

Terms used in the disclosure are for the purpose of describing particular embodiments only and are not intended to limit other embodiments. A singular expression may include a plural expression unless there is a contextually distinctive difference. In the disclosure, the term "include" or "have" is intended to indicate that characteristics, numbers, steps, operations, constitutional elements, and components disclosed in the specification or combinations thereof exist, and thus should be understood that there are additional possibilities of one or more other characteristics, numbers, steps, operations, constitutional elements, components or combinations thereof. Like reference numerals in the drawings denote members performing substantially the same function.

Figure 1B:
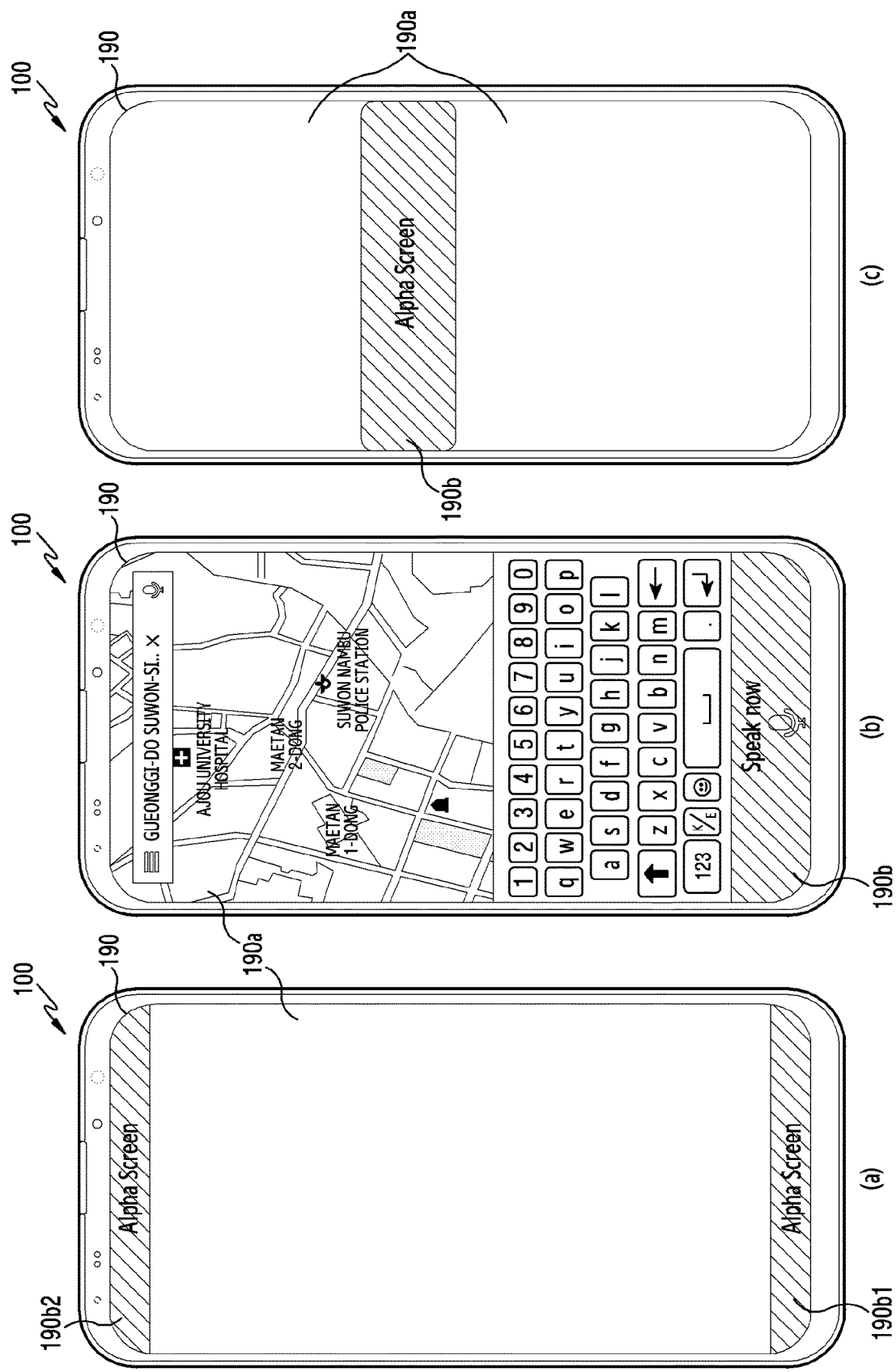
FIG. 1B is a schematic view illustrating an electronic device according to various embodiments of the disclosure.

FIG. 1A and FIG. 1B are schematic views illustrating an electronic device according to various embodiments of the disclosure.

Referring to FIG. 1A and FIG. 1B, a touch screen 190 is located at a center area in a front face 100a of an electronic device 100. The touch screen 190 may include a bendable display panel (not shown). In addition, the touch screen 190 may include a bendable touch panel (not shown) corresponding to the bendable display panel.

In various embodiments of the disclosure, the touch screen 190 of the electronic device 100 may be a touch screen having an increased vertical length. For example, if an aspect ratio of the existing touch screen is 16:9 (referred to as a 'first area, see FIG. 1B), the aspect ratio of the touch screen 190 may be 18.5:9 in various embodiments of the disclosure (e.g., with the increased vertical length). An area corresponding to the increased aspect ratio of 2.5:9 may be referred to as an alpha area (see FIG. 1B). The alpha area may be referred to as a second area. According to various embodiments, the aspect ratio of the touch screen 190 may exceed 16:9 and may be equal to or less than 22:9. The touch screen 190 may imply a first area 190a and a second area 190b. In the touch screen 190, the first area 190a and the second area 190b do not mean to be physically separated.

In various embodiments of the disclosure (e.g., with the increased vertical length), the aspect ratio of the touch screen 190 may be 5:3. In addition, the aspect ratio of the touch screen 190 may exceed 4:3 and may be equal to or less than 5.5:3. The aspect ratio (18.5:9, 5:3) increased in association with the aforementioned aspect ratio (16:9, 4:3) is only one embodiment, and it will be easily understood by those ordinarily skilled in the art that the disclosure is not limited thereto.

The touch screen 190 may include the main touch screen 190 and a single-edge touch screen (not shown) or dual edge touch screens 190-1 and 190-2 extended from the main touch screen 190. In the touch screen 190, the main touch screen 190 and the single-edge touch screen or the main touch screen 190 and the dual edge touch screen may be constructed integrally. In various embodiments of the disclosure, the touch screen 190 may mean to include a planar touchscreen (not shown), the main touchscreen 190 and the single-edge touchscreen (not shown) or the main touchscreen 190 and the both-edge touch screens 190-1 and 190-2. The touch screen 190 may be curved or bent through a flexible printed circuit board (not shown).

In FIG. 1A, the touch screen 190 displays a home screen 191.

In FIG. 1A, the home screen 191 may include a shortcut icon 191a or widget 191b corresponding to an application that can be selected by a user touch (e.g., including hovering). A status bar 192 may be displayed at an upper end of the home screen 191 to indicate a state of the electronic device 100 such as a battery charging state, strength of a received signal, and a current time. In addition, the home screen 191 of the electronic device 100 may be located at a lower end of the status bar 192 and/or only the home screen 191 may be displayed without having to display the status bar 192.

A first camera 151, a speaker 163, a proximity sensor 171, and an illumination sensor 172 may be located at a front upper portion (e.g., a bezel area) of the electronic device 100. According to various embodiments, a third camera 153 which is an iris camera for recognizing a user's iris and an LED (not shown) for iris recognition may be further included at the front upper portion of the electronic device 100. A second camera 152 (see FIG. 2) and a flash 154 (see FIG. 2) may be located at a rear face of the portable terminal 100.

A home button (not shown) which is a physical button may not be located at a lower front portion (e.g., a bezel area) of the electronic device 100.

A power/lock button (not shown) and a volume button (not shown) may be located at a lateral face of the electronic device 100. A lateral face 100b of the electronic device 100 may connect the front face and rear face of the electronic device 100.

The speaker 163 may be located at the upper end of the electronic device 100. A connector 165 and/or an additional speaker (not shown) may not be located at the lower end of the electronic device 100.

An insertion hole (not shown) through which an input pen 167 (see FIG. 2) having a button 167a (see FIG. 5D) can be inserted may be located at a lateral lower end of the electronic device 100. The input pen 167 may be stored inside the electronic device 100 through the insertion hole (not shown), and may be extracted from the electronic device 100 to use it.

In FIG. 1B, an example of a screen of the electronic device 100 may be displayed according to various embodiments of the disclosure.

In (a) to (c) of FIG. 1B, the touch screen 190 may be divided into the first area 190a and the second area (or the alpha area) 190b. In the touch screen 190, the first area 190a is an area corresponding to an aspect ratio of the aforementioned existing touch screen, and may be continued (or connected, in contact) with respect to the alpha area 190b.

The alpha area 190b is an area corresponding to an increased vertical length of the aspect ratio of the aforementioned existing touch screen, and may overlay (or overlap) or be floated on the first area 190a. The alpha area 190b may refer to a position within the first area 190a (e.g., see (b) of FIG. 1B).

The alpha area 190b may be the single alpha area 190b or the plurality of alpha areas 190b1 and 190b2. A size of the single alpha area 190b may be the same as a sum of sizes of the plurality of alpha areas 190b1 and 190b2 (e.g., including a difference of ±10%). The alpha area 190b may be located (see (b) of FIG. 1B) at each of upper and lower ends of the touch screen 190 or may be located (see (b) of FIG. 1B) at the lower end. The alpha area 190b may be located (not shown) at the upper end of the touch screen 190.

The alpha area 190b may be located at a first position (see (c) of FIG. 1B) within the touch screen 190. The alpha area 190b may be moved to the first position (e.g., from a position shown in (b) of FIG. 1B to a position shown in (c) of FIG. 1B) within the touch screen 190 by a user input (e.g., a touch, etc.). The alpha area 190b may be moved to the first position (e.g., from the position shown in (b) of FIG. 1B to the position shown in (c) of FIG. 1B) within the touch screen 190 under the control of the control unit 110 (see FIG. 2). When the alpha area 190b is located at the first position within the touch screen 190, the alpha area 190b may overlay (or overlap) or be floated on the first area 190a.

Figure 2:
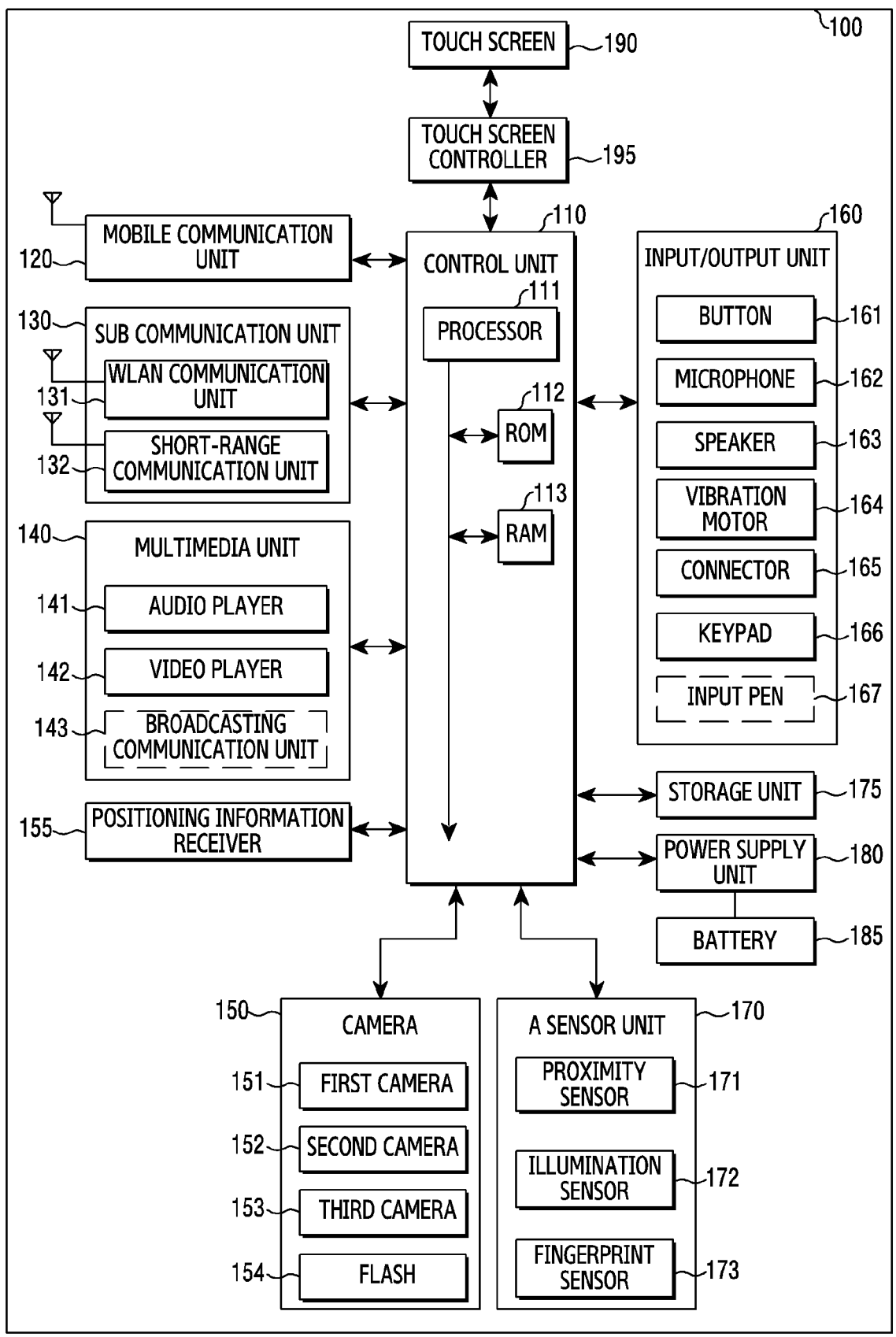
FIG. 2 is a schematic block diagram illustrating an electronic device according to various embodiments of the disclosure.

FIG. 2 is a schematic block diagram illustrating an electronic device according to various embodiments of the disclosure.

Referring to FIG. 1A to FIG. 2, the electronic device 100 may be operatively coupled to another device (e.g., another electronic device (not shown), or a server (not shown), etc.) by using at least one of a mobile communication unit 120, a sub communication unit 130, and the connector 165.

The electronic device 100 may have the touch screen 190 to transmit data to the outside or receive data from the outside via the communication unit (e.g., the communication circuit) 120 or 130. The electronic device 100 may have the first touch screen 190 to transmit data to the outside or receive data from the outside via the communication unit 120 or 130.

The electronic device 100 includes a control unit 110, the mobile communication unit 120, the sub communication unit 130, a multimedia unit 140, a camera 150, a positioning information receiver 155, an input/output unit (e.g., input/output circuit) 160, a sensor unit 170, a storage unit 175, and a power supply unit 180. In addition, the electronic device 100 includes the touch screen 190 and a touch screen controller 195.

The control unit 110 may include a processor 111 (e.g., a processing circuit). In addition, the control unit 110 may further include a ROM 112 which stores a control program to control the electronic device 100 and a RAM 113 which stores a signal or data which is input from the outside of the electronic device 100 or which is used as a storage area for various tasks performed in the electronic device 100.

The control unit 110 controls an overall operation of the electronic device 100 and a function of controlling a signal flow between the inner components 110 to 195 of the electronic device 100, and performs a data processing function. The control unit 110 may control power supply to the inner components 120 to 195 by using the power supply unit 180.

The processor 111 may include a Graphic Processing Unit (GPU) (not shown) for graphic processing. In addition, the processor 111 may further include a sensor processor (not shown) for controlling a sensor or a communication processor (not shown) for controlling communication The processor 111 may be implemented in a form of a System on Chip (SoC) including a core (not shown) and a GPU (not shown). In addition, the processor 111 may include a single core, dual cores, triple cores, quad cores, and other cores corresponding to multiples thereof.

The processor 111, the ROM 112, and the RAM 113 may be interconnected by means of a bus.

The control unit 110 may control the mobile communication unit 120, the sub communication unit 130, the multimedia unit 140, the camera 150, the positioning information receiver 155, the input/output unit 160, the sensor unit 170, the storage unit 175, the power supply unit 180, the touch screen 190, and the touch screen controller 195.

In various embodiments of the disclosure, the term 'control unit of the electronic device' may mean to include the processor 111, the ROM 112, and the RAM 113. In addition, the 'control unit of the electronic device' may be the processor 111.

The mobile communication unit 120 may be coupled to another device (e.g., another electronic device (not shown) or a server (not shown) or the like) via a mobile communication network by using at least one or two antennas under the control of the control unit 110.

The sub communication unit 130 may be coupled to another device (e.g., another electronic device or a server or the like) via a WLAN communication unit 131 and/or a short-range communication unit 132 by using at least one or two antennas under the control of the control unit 110. The sub communication unit 130 may include an antenna for a WLAN, an antenna for Magnetic Secure Transmission (MST) for electronic payment, or an antenna for Near Field Communication (NFC) communication.

The WLAN communication unit 131 may be coupled with an Access Point (AP) wirelessly at a place where the AP is installed under the control of the control unit 110. The WLAN communication unit 131 may support, for example, Wi-Fi communication.

The short-range communication may include Bluetooth communication, Bluetooth low energy communication, Infrared Data Association (IrDA), Ultra-Wideband (UWB) communication, Magnetic Security Transmission (MST), and/or NFC communication or the like.

The electronic device 100 may include one of the mobile communication unit 120, the WLAN communication unit 131, the short-range communication unit 132 or a combination of the mobile communication unit 120, the WLAN communication unit 131, and the short-range communication unit 132.

In various embodiments of the disclosure, the term 'communication unit' may include the mobile communication unit 120 and/or the sub communication unit 130.

The multimedia unit 140 may reproduce audio, reproduce video, and/or receive external broadcasting under the control of the control unit 110.

An audio player 141 may reproduce an audio source (e.g., an audio file including a file extension of mp3, wma, ogg, or wav) pre-stored in the storage unit 175 of the electronic device 100 or received from the outside by using an audio codec under the control of the control unit 110.

According to various embodiments of the disclosure, the audio player 141 may reproduce an auditory feedback in response to providing of a feedback corresponding to a determined characteristic to a second area. For example, the audio player 141 may reproduce an auditory feedback (e.g., an output of an audio source stored in the storage unit 175) in response to providing of the feedback corresponding to the determined characteristic to the second area via an audio codec under the control of the control unit 110.

A video player 142 may reproduce a digital video source (e.g., a video file including a file extension of mpeg, mpg, mp4, avi, mov, or mkv) pre-stored in the storage unit 175 of the electronic device 100 or received from the outside by using a video codec under the control of the control unit 110.

According to various embodiments of the disclosure, the video player 142 may reproduce a visual feedback in response to providing of the feedback corresponding to the determined characteristic to the second area. For example, the visual feedback (e.g., an output of a video source stored in the storage unit 175) may be reproduced via a video codec under the control of the control unit 110.

A broadcasting communication unit 143 may receive a broadcasting signal (e.g., a TV broadcasting signal, a radio broadcasting signal, or a data broadcasting signal) and broadcasting additional information (e.g., an Electronic Program Guide (EPG) or an Electronic Service Guide (ESG)) output from an outside broadcasting station via an antenna under the control of the control unit 110.

The multimedia unit 140 may include the audio player 141 and the video player 142 except for the broadcasting communication unit 143 in response to the performance or structure of the electronic device 100. In addition, the control unit 110 may be implemented to include at least one of the audio player 141 and video player 142 of the multimedia unit 140.

The camera 150 may capture a still image or video under the control of the control unit 110. The camera 150 may capture an iris under the control of the control unit 110.

The camera 150 includes the first camera 151 located at a front face of the electronic device 100 and the second camera 152 located at a rear face of the electronic device 100. In addition, the third camera (or the iris capturing camera) 153 for capturing an iris may be located at one side of the first camera 151.

The first camera 151 or the second camera 152 may include an auxiliary light source (e.g., the flash 153) for providing light quantity required for capturing. In addition, the auxiliary light source (e.g., an iris recognizing LED, not shown) required for capturing an iris may not be located at the front face of the electronic device 100.

The camera 150 may further include the first camera 151 located at the front face of the electronic device 100 and an additional camera (e.g., a fourth camera (not shown)) (e.g., an interval between two optical axes is greater than 5 mm and less than 80 mm) adjacent to the first camera 151. In addition, the camera 150 may further include a form implemented such that the first camera 151 and the fourth camera are implemented as one unit. The control unit 110 may capture a 3D still image or 3D video by using the first camera 151 and the fourth camera.

The camera 150 may further include the second camera 152 located at the rear face of the electronic device 100 and an additional camera (e.g., a fifth camera (not shown)) (e.g., an interval between optical axes is greater than 5 mm and less than 80 mm) adjacent to the second camera 152. In addition, the camera 150 may further include a form implemented such that the second camera and the fifth camera are implemented as one unit. The control unit 110 may capture a 3D still image or 3D video by using the second camera 152 and the fifth camera.

The camera 150 may perform wide angle shooting, telephoto shooting or close-up shooting by using an additional lens (not shown) detachable from a separate adaptor (not shown).

The positioning information receiver 155 receives signals (e.g., orbit information of a GPS satellite, time information of a satellite, a navigation message, etc.) periodically from a plurality of satellites (not shown) on the Earth's orbit.

The electronic device 100 may calculate positions of the electronic device 100 and each satellite (not shown) by using the signals received from the plurality of satellites, and may calculate a distance by using a transmission/reception time difference. Triangulation may be used to calculate the position, time, or movement speed of the electronic device 100. An additional satellite may be required for orbit correction or time correction.

In an indoor situation, the electronic device 100 may use a wireless AP (not shown) to detect the position or movement speed of the electronic device 100. The detecting of the position of the electronic device 100 in the indoor situation may use a cell-ID scheme, an enhanced cell-ID scheme, or an Angle of Arrival (AoA) scheme. In addition, the electronic device 100 may use a wireless beacon (not shown) to detect the position or movement speed of the electronic device 100 located indoor.

The input/output unit 160 may include one or two buttons 161, one or two microphones 162, one or two speakers 163, one or two vibration motors 164, a connector 165, and at least one of a keypad 166 and an input pen 167.

Referring to FIG. 1A to FIG. 2, the button 161 may include one or a plurality of volume buttons (not shown) located at a lateral face of the electronic device 100 and a power/lock button (not shown).

The button 161 may be implemented with not only a physical button but also a touch button. For example, a home button (not shown), a recently executed app button (not shown), and/or a back button (not shown) may be implemented with the touch button. In addition, a home button 161a (see FIG. 6C), a recently executed app button 161b (see FIG. 6C), and/or a back button 161c (see FIG. 6C) may be displayed as a soft button menu 161m in a text, image, or icon form on the touch screen 190.

The control unit 110 may receive an electrical signal transmitted from the button 161 in response to reception of a user input. The control unit 110 may use the received signal (e.g., a press of the button 161) to detect the user input.

The shape, position, function, name, and the like of the button 161 of FIG. 1A to FIG. 2 are one example for explanations, and it will be easily understood by those ordinarily skilled in the art that the disclosure is not limited thereto and thus any change, modification, or alteration is possible.

The microphone 162 generates a voice or sound received from the outside into an electrical signal under the control of the control unit 110. The electrical signal generated from the microphone 162 may be converted in an audio codec under the control of the control unit 110 and then may be stored in the storage unit 175 or be output via the speaker 163.

Referring to FIG. 1A to FIG. 2, at least one or two microphones 162 may be located at a front face, lateral face, and/or rear face of the electronic device 100.

The speaker 163 outputs a sound corresponding to various signals (e.g., a radio signal, a broadcast signal, an audio source, a video file, photographing, etc.) to be decoded by the audio codec under the control of the control unit 110.

Referring to FIG. 1A to FIG. 2, the single or plurality of speakers 163 may be located at the front face, lateral face, and/or rear face of the electronic device 100. In addition, the plurality of speakers (not shown) may be located at the lateral face of the electronic device 100.

According to various embodiments of the disclosure, the speaker 163 may output an auditory feedback in response to providing of the feedback corresponding to the determined characteristic to the second area. For example, the speaker 163 may output the auditory feedback in response to the providing of the feedback corresponding to the determined characteristic to the second area under the control of the control unit 110.

The vibration motor 164 converts an electrical signal into a mechanical vibration under the control of the control unit 110. The vibration motor 164 may include a linear vibration motor, a bar type vibration motor, a coin type vibration motor, or a piezoelectric element vibration motor.

At least one or two vibration motors 164 may be located inside the electronic device 100. The vibration motor 164 may vibrate the entirety of the electronic device 100, or may locally vibrate only a part thereof.

According to various embodiments of the disclosure, the vibration motor 164 may output a tactile feedback corresponding providing of the feedback corresponding to the determined characteristic to the second area. In addition, the vibration motor 164 may provide various tactile feedbacks (e.g., vibration intensity and vibration duration time) pre-stored or received from the outside on the basis of a control command of the control unit 110.

The connector 165 may be used as an interface for connecting the electronic device 100 and an external device (not shown) or a power source (not shown). For example, the connector 165 may include a micro USB type connector or a USB-C type connector.

The keypad 166 receives a user input for the control of the electronic device 100. The keypad 166 has a button (or a key), and may include a virtual keypad 166a (see FIG. 4C) displayed within the touch screen 190, a pressure touch keypad (not shown) corresponding to pressure (or force) applied to the user input, and a physical keypad (not shown) located at a lower area of the front face of the electronic device 100.

The keypad 166 may further include a separate keypad (or a keyboard, not shown) which uses short-range communication or which can be coupled in a wired manner.

The input pen 167 can be inserted/extracted at the lateral face of the electronic device 100, and may be used by a user to select (or touch) an object (e.g., a menu, a text, an image, a video, a figure, an icon, and a shortcut icon) constituting the touch screen 190 of the electronic device 100 or a handwriting/drawing application screen (e.g., a memo screen, a notepad screen, a calendar screen, etc.) displayed on the touch screen 190 and/or content (e.g., a text file, an image file, an audio file, a video file, payment information, or a web page) or to perform handwriting or drawing (or painting or sketching).

The sensor unit 170 may use one or a plurality of sensors to detect a surrounding state of the electronic device and/or a state (e.g., a tilt (or an angle), shaking, etc.) of the electronic device 100.

The sensor unit 170 may include the proximity sensor 171 for detecting whether the user is in proximity to the electronic device 100, the illumination sensor 172 for detecting quantity of light around the electronic device 100, or a fingerprint sensor 173 for obtaining (or capturing) a user's fingerprint.

The sensor unit 170 may include a sensor (not shown) for detecting a tilt (or an angle) of the electronic device 100, a motion sensor (not shown) for detecting a motion of the electronic device 100, an acceleration sensor (not shown), a geomagnetic sensor (not shown), or a gyro sensor (not shown). In addition, the sensor unit 170 may further include a bio-signal sensor (not shown) including a heart-rate sensor (not shown).

The sensor included in the sensor unit 170 detects a user state (e.g., a body temperature, a heart rate, a brainwave, etc.) and a state of the electronic device 100, and generates an electrical signal corresponding to the detection and then transmits it to the control unit 110.

It will be easily understood by those ordinarily skilled in the art that the sensor included in the sensor unit 170 can be added, changed, or deleted according to performance of the electronic device 100.

The storage unit 175 may store a signal or data which is input/output in accordance with operations of components 110 to 195 under the control of the control unit 110. The storage unit 175 may store a control program for controlling the electronic device 100 or the control unit 110 and a Graphic User Interface (GUI) related to an application provided from a manufacturer or downloaded from the outside, images corresponding to the GUI, user information, documents, databases, or related data.

The storage unit 175 may store a visual feedback (e.g., a video source, etc.) recognizable by the user by being output in response to providing of the feedback corresponding to the determined characteristic to the second area, an auditory feedback (e.g., a sound source, etc.) recognizable by the user by using output from the speaker 163, and a tactile feedback (e.g., a haptic pattern, etc.) recognizable by the user by being output from the vibration motor 164.

The storage unit 175 may store a feedback providing time (e.g., 500 ms) of a feedback provided to the user.

In various embodiments of the disclosure, the term 'storage unit' includes the storage unit 175, the ROM 112 inside the control unit 110, the RAM 113, or a memory card (e.g., a micro SD card, etc., not shown) equipped in the electronic device 100. The storage unit 175 may include a non-volatile memory, a volatile memory, a Hard Disk Drive (HDD), or a Solid State Drive (SSD).

The power supply unit 180 may provide power to the components 110 to 195 of the electronic device 100 under the control of the control unit 110. The poser supply unit 180 may provide power, which is input from an external power source via a wired cable (not shown) coupled to the connector 165, to each of the components of the electronic device 100 under the control of the control unit 110. In addition, the power supply unit 180 may charge one or more batteries 185 under the control of the control unit 110.

The power supply unit 180 may provide charged power of the battery 185 to an accessary device (e.g., a watch, etc., not shown) via a cable. In addition, the power supply unit 180 may wirelessly charge another device (e.g., another electronic device or an accessory device) by using an additional transmission coil (not shown) electrically coupled to the battery 185 under the control of the control unit 110. A wireless charging scheme may include, for example, a magnetic resonance scheme, an electromagnetic wave scheme, or a magnetic induction scheme.

The touch screen 190 may provide the user with a GUI corresponding to various services (e.g., a voice call, a video call, data transmission, broadcast reception, photographing, video watching, an electronic payment including a mobile payment, etc.). The touch screen 190 includes a touch panel (not shown) for receiving a user input (e.g., a touch, etc.) and a display panel (not shown) for displaying a screen. In addition, the touch screen 190 may include an edge touch panel (not shown) for receiving a user input and an edge display panel (not shown) for displaying a screen.

The touch screen 190 may transmit to the touch screen controller 195 an analog signal which corresponds to a single touch or multiple touches and which is input via the home screen 191 or the GUI. The touch screen 190 may receive the single touch or the multiple touches input via the input pen 167 or a user's body (e.g., a finger including a thumb).

The touch screen 190 according to various embodiments of the disclosure may output a visual feedback in response to providing of the feedback corresponding to the determined characteristic to the second area. In various embodiments of the disclosure, the display unit may mean to include the touch screen 190.

The touch screen controller 195 converts an analog signal corresponding to a single touch (or multiple touches) received from the touch screen 190 into a digital signal, and transmits it to the control unit 110. The control unit 110 may use the digital signal received from the touch screen controller 195 to calculate a touch position (e.g., an X-coordinate and a Y-coordinate) of a touch received at the touch screen 190.

The control unit 110 may use the digital signal received from the touch screen controller 195 to control the touch screen 190. For example, the control unit 110 may display a selected shortcut icon (also referred to as an icon) on the touch screen 190 in response to the input touch such that the shortcut icon is distinct from another shortcut icon, or may display a game application screen on the touch screen 190 by executing an application (e.g., a game application) corresponding to the selected shortcut icon.

An electronic device according to various embodiments of the disclosure includes an extended touch screen which displays an application screen and a processor which controls the touch screen. The processor divides the extended touch screen into a first area and a second area in response to a user input, and provides a feedback corresponding to an extension function of a characteristic area to the second area according to a determined characteristic of the characteristic area between the first area and the second area.

According to an aspect of the disclosure, the extended touch screen may be implemented by extending a vertical rate of an aspect ratio of a touch screen before being extended.

According to an aspect of the disclosure, the processor may provide a different feedback according to the characteristic of the characteristic area.

According to an aspect of the disclosure, if the application is different and the characteristic of the characteristic area is identical, the processor may provide the same feedback.

According to an aspect of the disclosure, the extended touch screen may be implemented with one of a planar touch screen, a main touch screen and a single edge touch screen, and a main screen and a dual edge touch screen.

According to an aspect of the disclosure, the processor may control the second area to be located at one of an upper end and lower end of the extended touch screen.

Regarding the components of the electronic device 100 of FIG. 1A to FIG. 2, it can be easily understood by those ordinarily skilled in the art that at least one component can be added (e.g., adding of an additional touch screen), deleted (e.g., a component indicated by a dotted line in FIG. 2), or changed according to performance of the electronic device 100.

Figure 3:
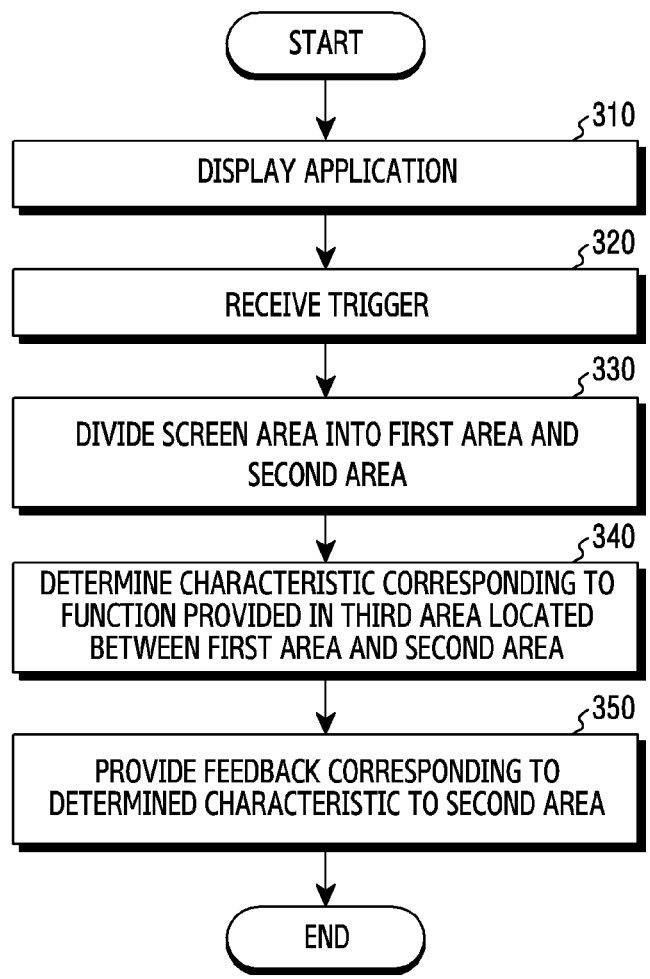
FIG. 3 is a schematic flowchart illustrating a screen display method of an electronic device according to various embodiments of the disclosure.

FIG. 3 is a schematic flowchart illustrating a screen display method of an electronic device according to various embodiments of the disclosure.

FIG. 4A to FIG. 4F illustrate examples of a screen display method according to an embodiment of the disclosure.

An application screen is displayed in step 310 of FIG. 3.

Figure 4A:
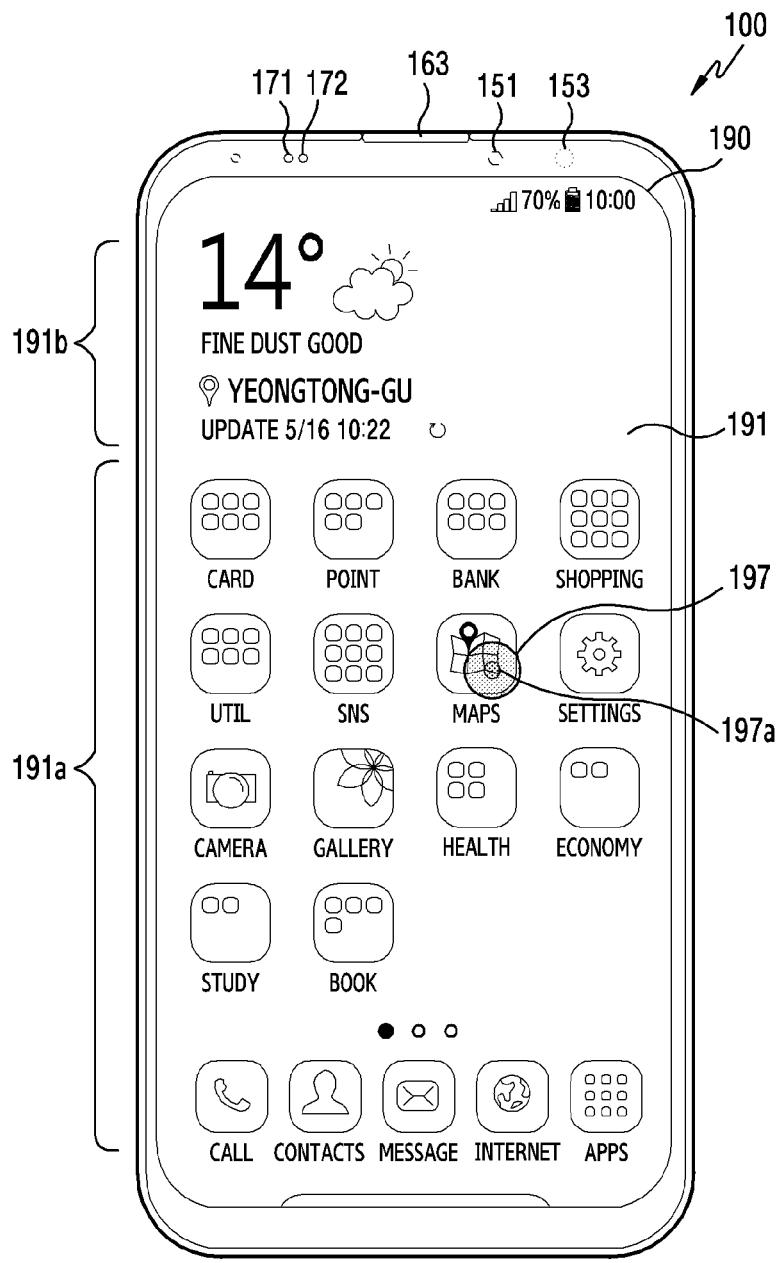
FIGS. 4A, 4B, 4C, 4D, 4E, and 4F illustrate examples of a screen display method according to an embodiment of the disclosure.

Referring to FIG. 4A, the home screen 191 may be displayed on the touch screen 190 of the electronic device 100.

A user may select (e.g., a first user input 197) one shortcut icon (e.g., corresponding to an application) among at least one or two shortcut icons 191a displayed on the home screen 191. In various embodiments of the disclosure, a user input may include, for example, a touch, a press, a voice, a motion, or the like.

The control unit 110 may use the touch screen 190 and the touch screen controller 195 to detect the first user input 197. The control unit 110 may use an electrical signal received from the touch screen controller 195 to calculate a first user input position (e.g., an X1-coordinate and a Y1-coordinate) 197a corresponding to the first user input 197.

The control unit 110 may execute an application (e.g., a map application) corresponding to the first user input. An application screen 200 may be displayed on the touch screen 190 under the control of the control unit 110.

Figure 4B:
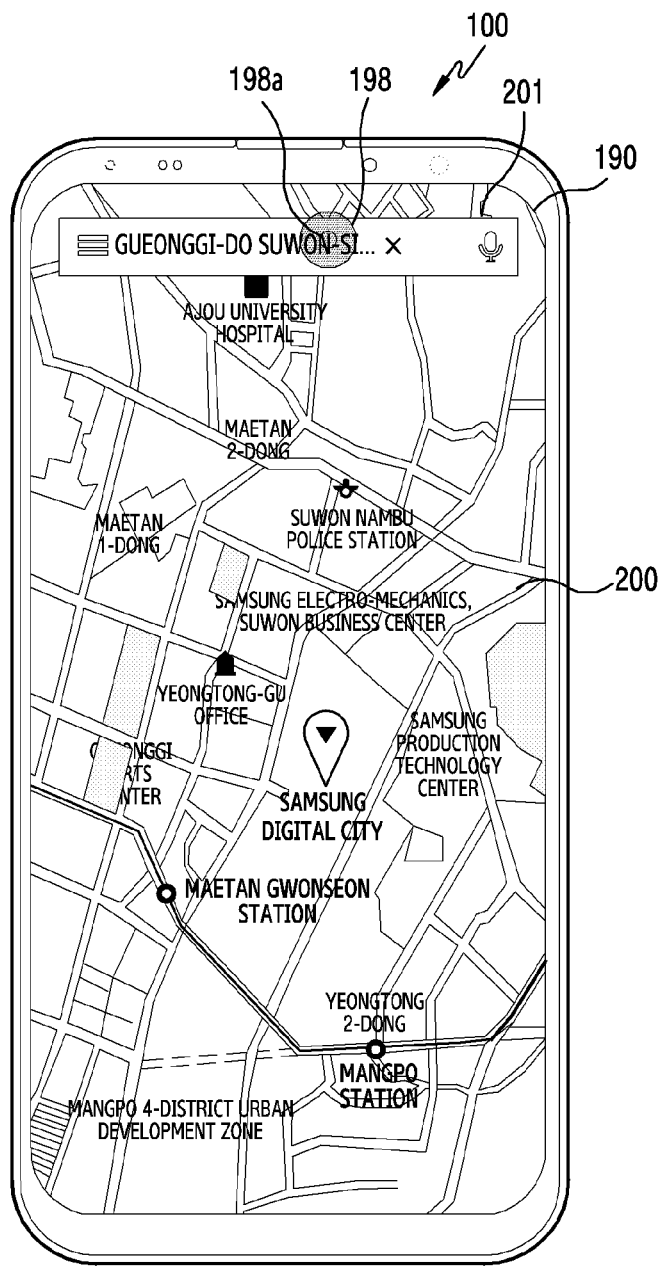

Referring to FIG. 4B, the application screen 200 may be displayed on the touch screen 190. The user may select (e.g., a second user input 198) a search area 201 of the application screen 200. In FIG. 4B, the application screen 200 may be displayed on the touch screen 190 including a first area and a second area. In an embodiment of the disclosure, a screen area may be an area corresponding to the touch screen 190.

The application may include not only the map application but also a web browser, a mobile payment application, a photo album application, a word processor, a spread sheet, a contacts application, a calendar application, a text (SMS) application, a messenger application, a memo application, an alarm application, a Social Network System (SNS) application, a game store, a chatting application, a music player, a video player, or an application executable in the electronic device 100. In addition, the application screen may include a home screen.

The control unit 110 may use the touch screen 190 and the touch screen controller 195 to detect the second user input 198. The control unit 110 may use an electrical signal received from the touch screen controller 195 to calculate a second user input position (e.g., an X2-coordinate and a Y2-coordinate) 198a corresponding to the second user input 198.

The control unit 110 may execute the keypad 166a corresponding to the second user input.

Figure 4C:
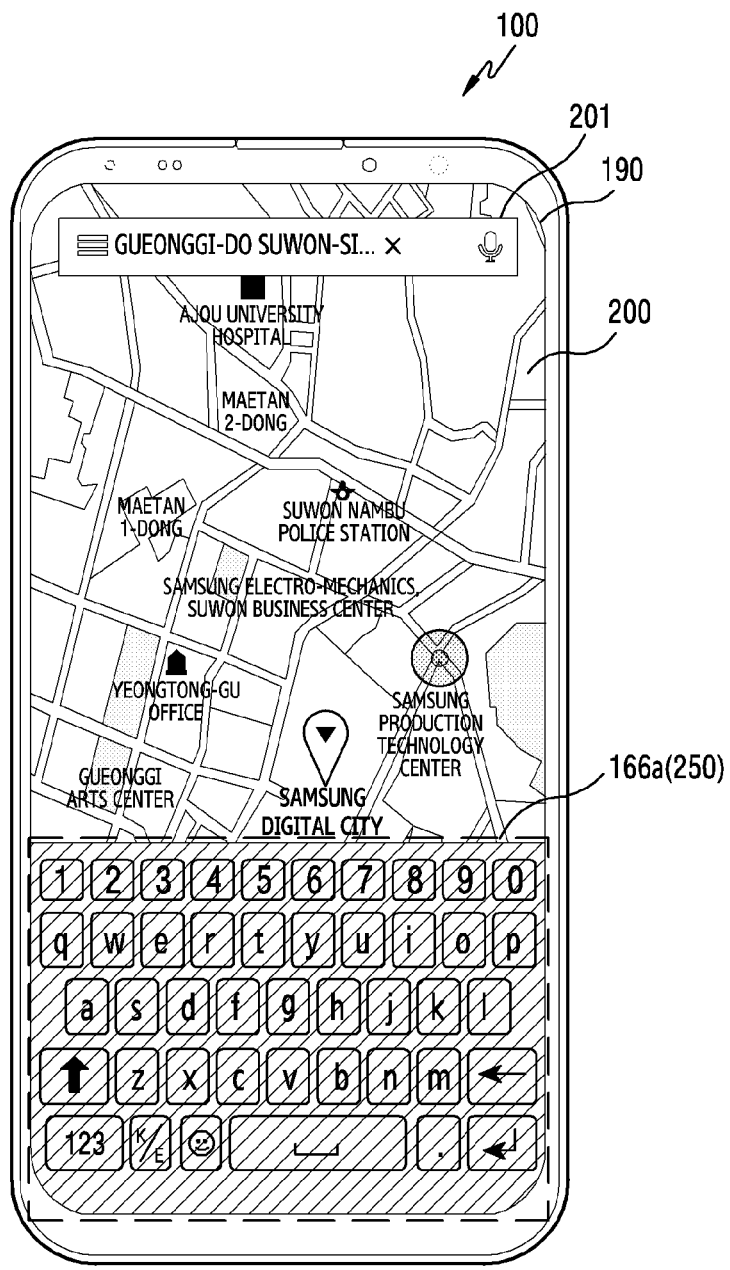

Referring to FIG. 4C, the keypad 166a may be displayed on the application screen 200 of the touch screen 190 under the control of the control unit 110. The control unit 110 may control the first keypad 166a to be displayed on the application screen 200.

The keypad 166a may be overlaid on the application screen 200. The keypad 166a may be displayed to be overlaid on an area (e.g., an alpha area) different from the application screen 200. In addition, the keypad 166a may be displayed to be distinct from the application screen 200 (e.g., in a shaded manner).

According to various embodiments of the disclosure, in FIG. 4C, the application screen 200 may be displayed on the touch screen 190 including the first area and the second area. When the keypad 166a is displayed together on the application screen 200, the application screen 200 and the keypad 166a may be located within the first area and the second area. In addition, it may mean that the keypad 166a is included within the first area 190a and the second area 190b.

In various embodiments of the disclosure, the keypad 166a may be referred to as a third area. The third area may be referred to as a characteristic area. The control unit 110 may use the third area to determine an extension function (or an extension screen corresponding to the extension function) that can be displayed on the alpha area 190b. In addition, the control unit 110 may use a function (e.g., typing, etc.) of the third area to determine the extension function (or the extension screen corresponding to the extension function) that can be displayed on the alpha area 190b.

The aforementioned third area (e.g., the keypad 166a) is only one example, and any screen may be possible as long as the screen is capable of displaying the extension screen on the alpha area 190b.

A trigger is received in step 320 of FIG. 3.

Referring to FIG. 4C, the user may execute a third user input 199 on the application screen 200. The third user input 199 may be a determined touch (or touch gesture).

The third user input 199 may include, for example, a long press (at least two seconds (changeable)) or a rotation (a left rotation or a right rotation). The aforementioned user input 199 is only one example, and is changeable according to a configuration, which can be easily understood by those ordinarily skilled in the art. The third user input 199 may be a trigger for dividing (or splitting) a screen area corresponding to the touch screen into a plurality of screen areas.

The screen area is divided into the first area and the second area in step 330 of FIG. 3.

Figure 4D:
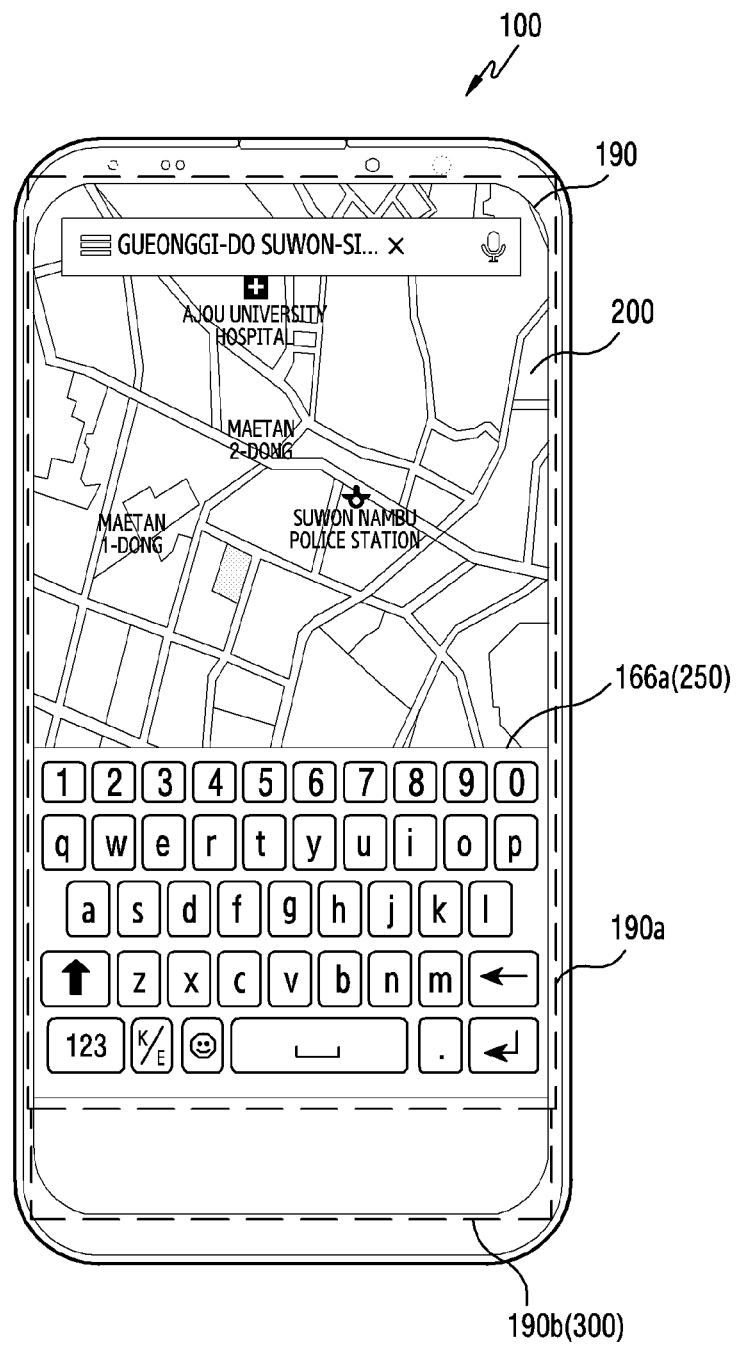

Referring to FIG. 4D, upon receiving the third user input, a screen area corresponding to the touch screen 190 may be divided (not a physical division) into the first area 190*a* and the second area 190*b*.

The control unit 110 may provide control such that the screen area is divided (not a physical division) into the first area 190*a* and the second area 190*b* in response to the received third user input. In addition, the control unit 110 may display the screen area so as to be divided (not a physical division) into the first area 190*a* and the second area 190*b* in response to the received third user input.

A size of the first area 190*a* is less than a size of the screen area (corresponding to the touch screen). A size of the second area 190*b* is less than a size of the first area 190*a*. In addition, the size of the second area 190*b* is less than the size of the screen area (corresponding to the touch screen).

When the screen area is displayed to be divided into the first area 190*a* and the second area 190*b*, the control unit 110 may provide control such that the second area 190*b* is displayed as a blank area. When the screen area is displayed to be divided into the first area 190*a* and the second area 190*b*, the control unit 119 may provide control such that the second area 190*b* is displayed as a blank area during a determined time (e.g., 1 second or less, changeable).

When the screen area is displayed to be divided into the first area 190*a* and the second area 190*b*, the control unit 110 may display a determined image (e.g., a part of the home screen or a part of the application screen 200, changeable) on the second area 190*b*.

In FIG. 4D, the second area 190*b* may be located not only at a lower end but also an upper end of the touch screen 190. The second area 190*b* may be located at the lower end of the touch screen 190 and at another area other than the lower end. In addition, the control unit 110 may display the second area 190*b* at the lower end so as to be distinct according to a configuration (e.g., the lower end). The second area 190*b* may designate a position displayed through the configuration (e.g., a lower end, an upper end, a middle end, etc.) according to a priority.

A characteristic corresponding to a function provided in the third area located between the first area and the second area is determined in step 340 of FIG. 3.

Referring to FIG. 4D, the first area 190*a* and the second area 190*b* are displayed on the screen area. The keypad 166*a* corresponding to the third area is displayed together within the first area 190*a*. The keypad 166*a* may be located between the first area 190*a* and the second area 190*b*. The position of the keypad 166*a* located between the first area 190*a* and the second area 190*b* may imply the keypad 166*a* which is overlaid (or overlapped) or floated on the first area 190*a*.

The control unit 110 may determine a characteristic of the third area 166*a*. The control unit 110 may identify the characteristic of the third area (e.g., an identification or the like as unique information of the third area). When the third area is the keypad 166*a*, the user may use the displayed keypad 166*a* to input a text (or an icon, an image, etc.).

The control unit 110 may determine the characteristic of the third area corresponding to the keypad 166*a* through the identification. A feedback corresponding to the determined characteristic (e.g., the identification) may include a voice input, a motion input, a handwriting input, or a touch (or a touch gesture) input.

When the third area has the same characteristic, another feedback may be provided according to an application displayed on the first area. Details thereof will be described below.

One or a plurality of feedbacks may correspond to the determined characteristic. In addition, when the plurality of feedbacks correspond to the determined characteristic, a priority for the plurality of feedbacks may be determined.

The feedback corresponding to the determined characteristic is provided to the second area in step 350 of FIG. 3.

Referring to FIG. 4D, a feedback (or an extension screen) 300 based on the determined characteristic of the third area is provided to the second area 190*b*. The control unit 110 may provide control such that the feedback (or the extension screen 300) corresponding to the determined characteristic is displayed on the second area 190*b*. The aforementioned feedback 300 may be, for example, a voice input screen 301. In addition, the control unit 110 may provide control such that the microphone 162 operates (e.g., power supply) in response to providing of the voice input screen 301.

The feedback corresponding to the determined characteristic (e.g., input) may include a motion input screen (not shown) corresponding to a motion of the electronic device 100, a handwriting input screen 304 (see FIG. 5D) corresponding to handwriting through the input pen 167, or a touch (or touch gesture) input screen (not shown).

When the feedback is the motion screen, the control unit 110 may provide control such that a sensor (e.g., a motion sensor, an acceleration sensor, etc.) corresponding to motion recognition operates in response to providing of the motion input screen. When the feedback is the handwriting input screen, the control unit 110 may provide control to recognize handwriting of the input pen 167, which is input on the handwriting input screen. In addition, when the feedback is the touch (or the touch gesture) input screen, the control unit 110 may provide control to detect a touch (or a touch gesture) which is input on the touch (or the touch gesture) input screen.

The control unit 110 may provide the user with an additional feedback corresponding to the displaying of the feedback (or the extension screen 300).

The provided additional feedback may be provided as one of a visual feedback, an auditory feedback, and a tactile feedback. In addition, the control unit 110 may provide the user with a combination of the visual feedback, the auditory feedback, and the tactile feedback.

The visual feedback may include a visual effect (e.g., an additional image or an animation effect such as fading applied to the additional image, not shown) corresponding to the displaying of the feedback (or the extension screen 300).

The control unit 110 may display the visual feedback on the touch screen 190. The control unit 110 may display the visual feedback on one of the first area 190*a* and the second area 190*b*. In addition, the control unit 110 may display the visual feedback by combining the first area 190*a* and the second area 190*b*.

The auditory feedback may include a sound corresponding to the displaying of the feedback (or the extension screen 300). The control unit 110 may output the auditory feedback through the speaker 163. The control unit 110 may output the auditory feedback through the single or plurality of speakers 163*a*.

The tactile feedback may include a vibration corresponding to the displaying of the feedback (or the extension screen 300). The control unit 110 may output the tactile feedback through the vibration motor 164. When a plurality of vibration motors are present, the control unit may selectively output the tactile feedback through one vibration motor among the plurality of vibration motors.

An additional feedback providing time (e.g., 300 ms) provided to the user may be changed according to an environment configuration (not show). In addition, at least one of a plurality of provided feedbacks (e.g., the visual feedback, the auditory feedback, and the tactile feedback) may be selected in response to the displaying of the feedback (e.g., the extension screen 300).

Figure 4E:
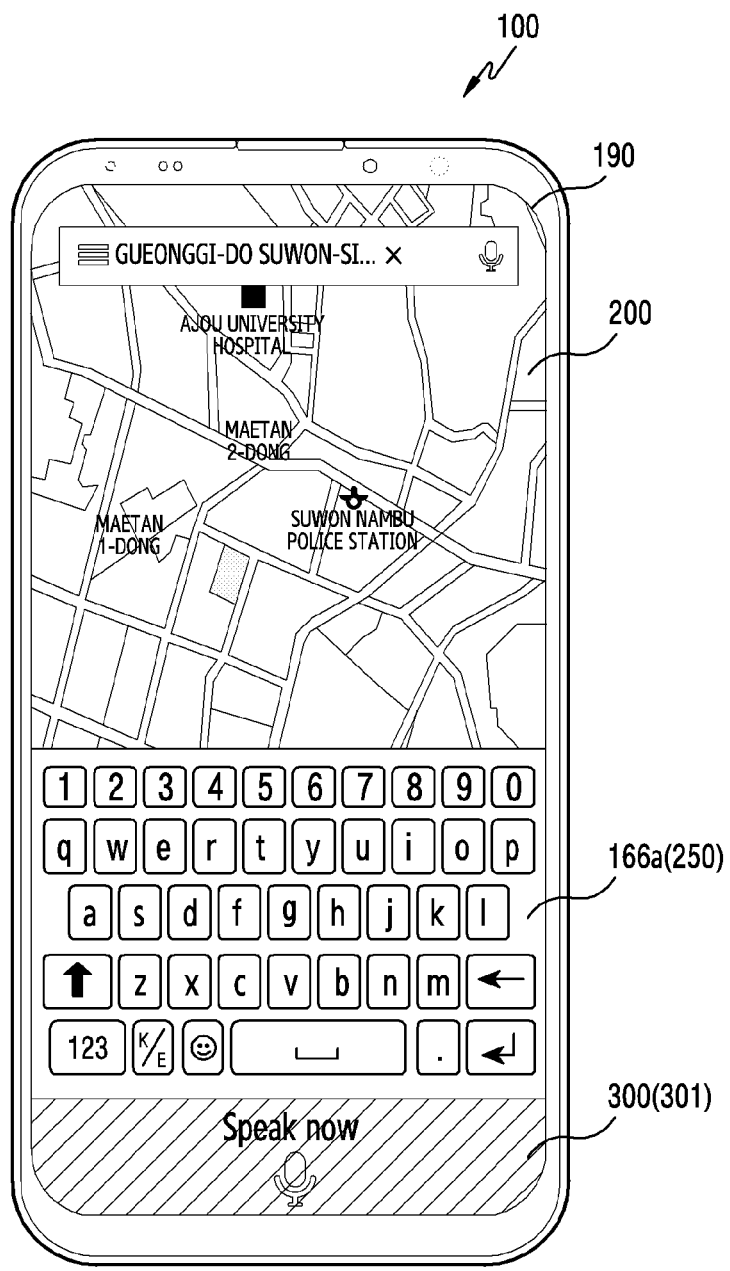
Figure 4F:
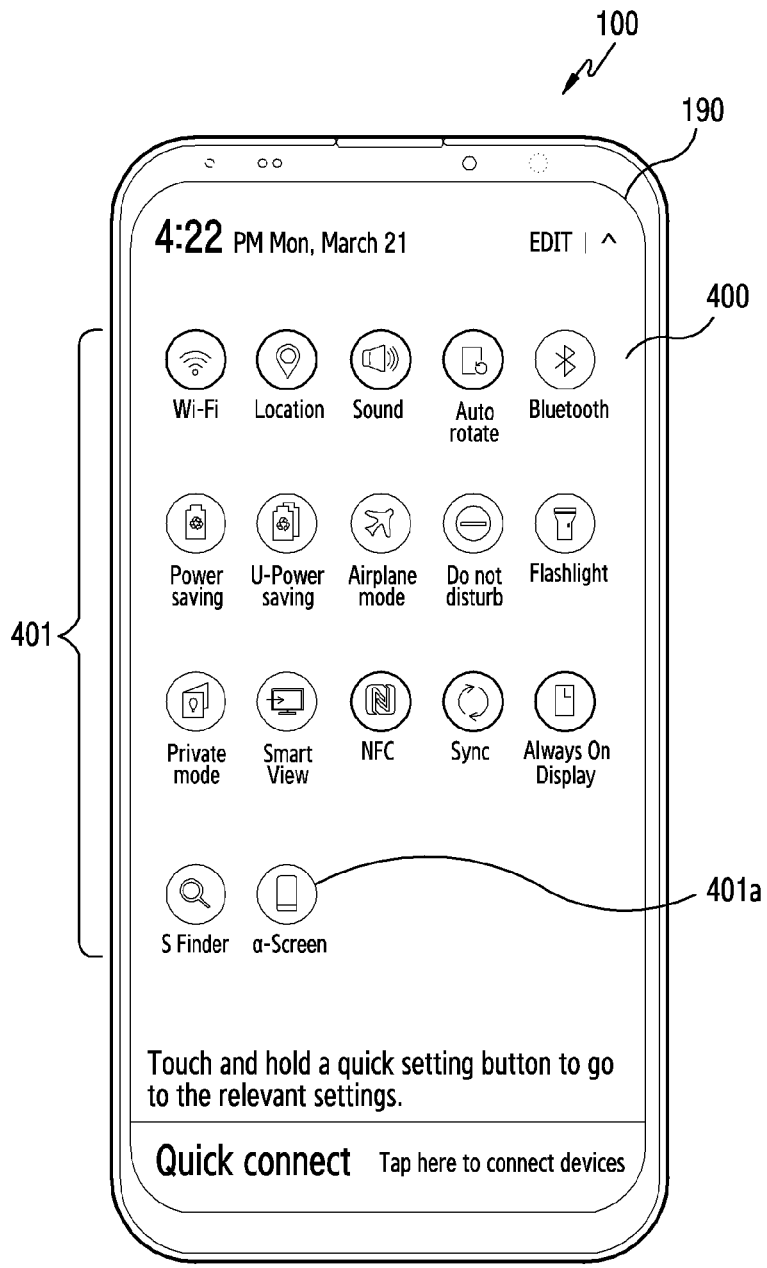

In another embodiment of the disclosure, referring to FIG. 4F, a quick setting list 400 may be displayed on the touch screen 190. The user may select an alpha screen icon 401a which is one of shortcut icons to be displayed from the quick setting list 400. The alpha screen icon 401a may be a setting icon for activating an alpha screen by dividing (or splitting) a screen area corresponding to a touch screen into a plurality of screen areas.

Figure 6A:
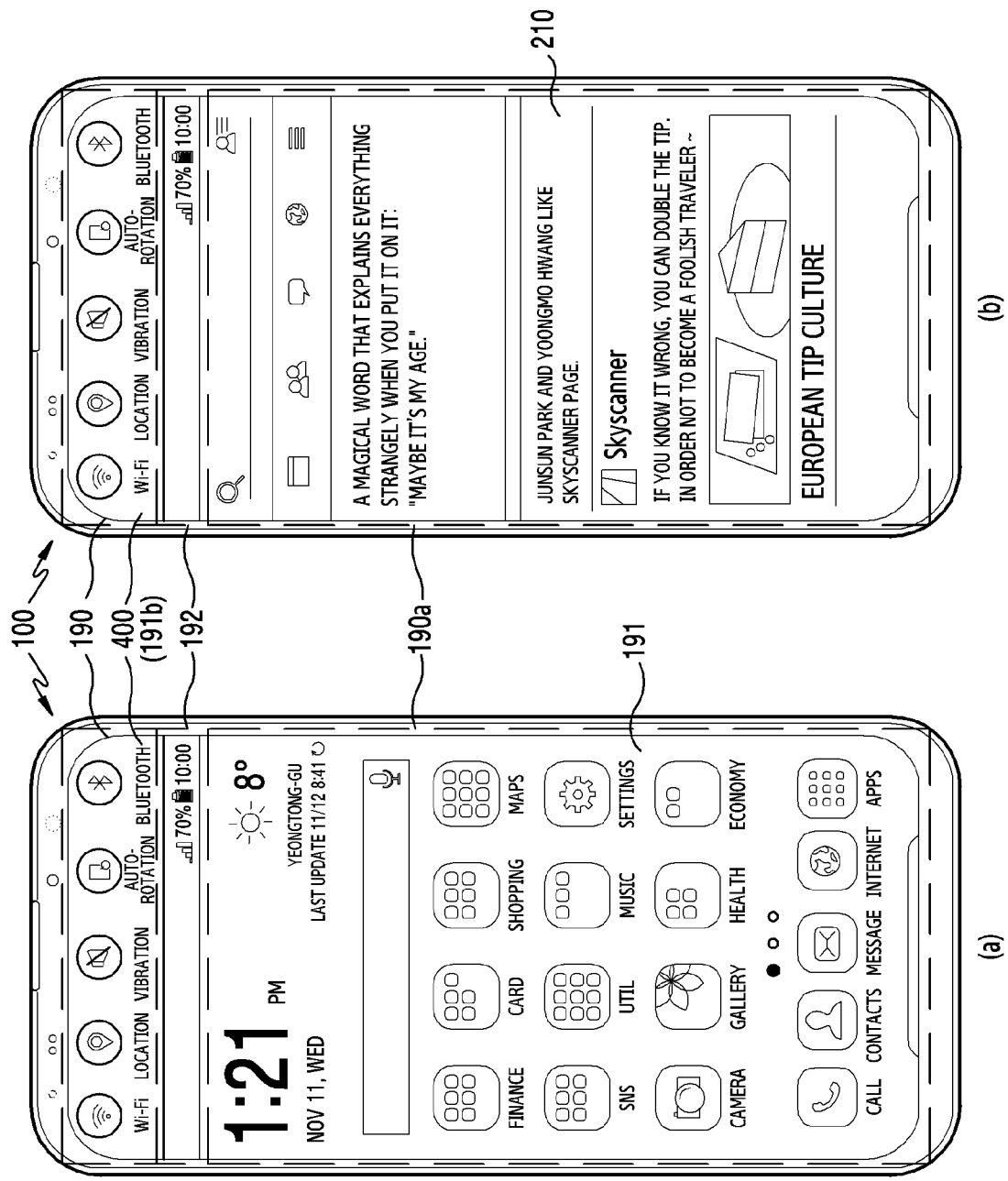
FIGS. 6A, 6B, and 6C illustrate examples of a screen display method according to another embodiment of the disclosure.
Figure 6B:
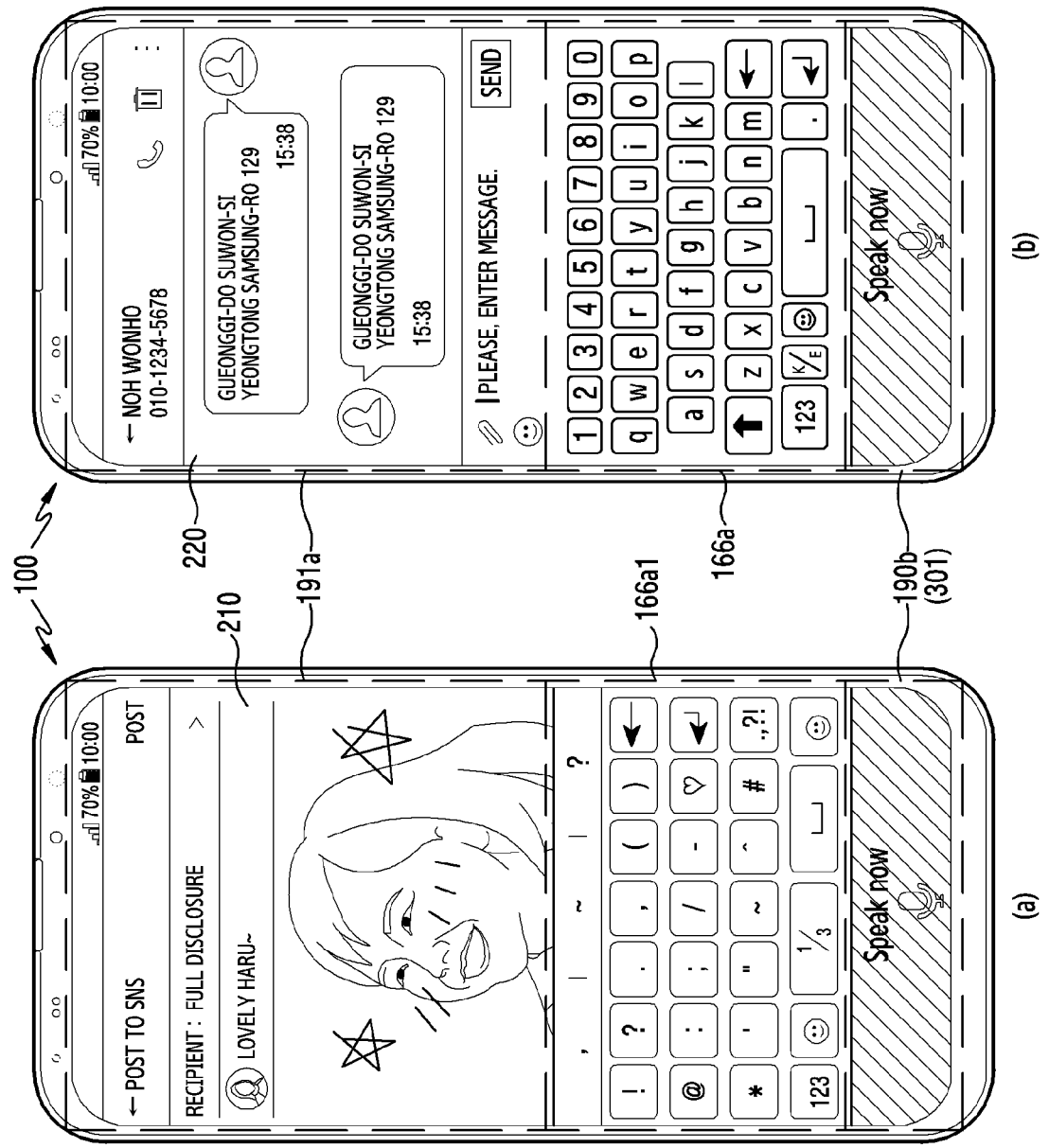
Figure 6C:
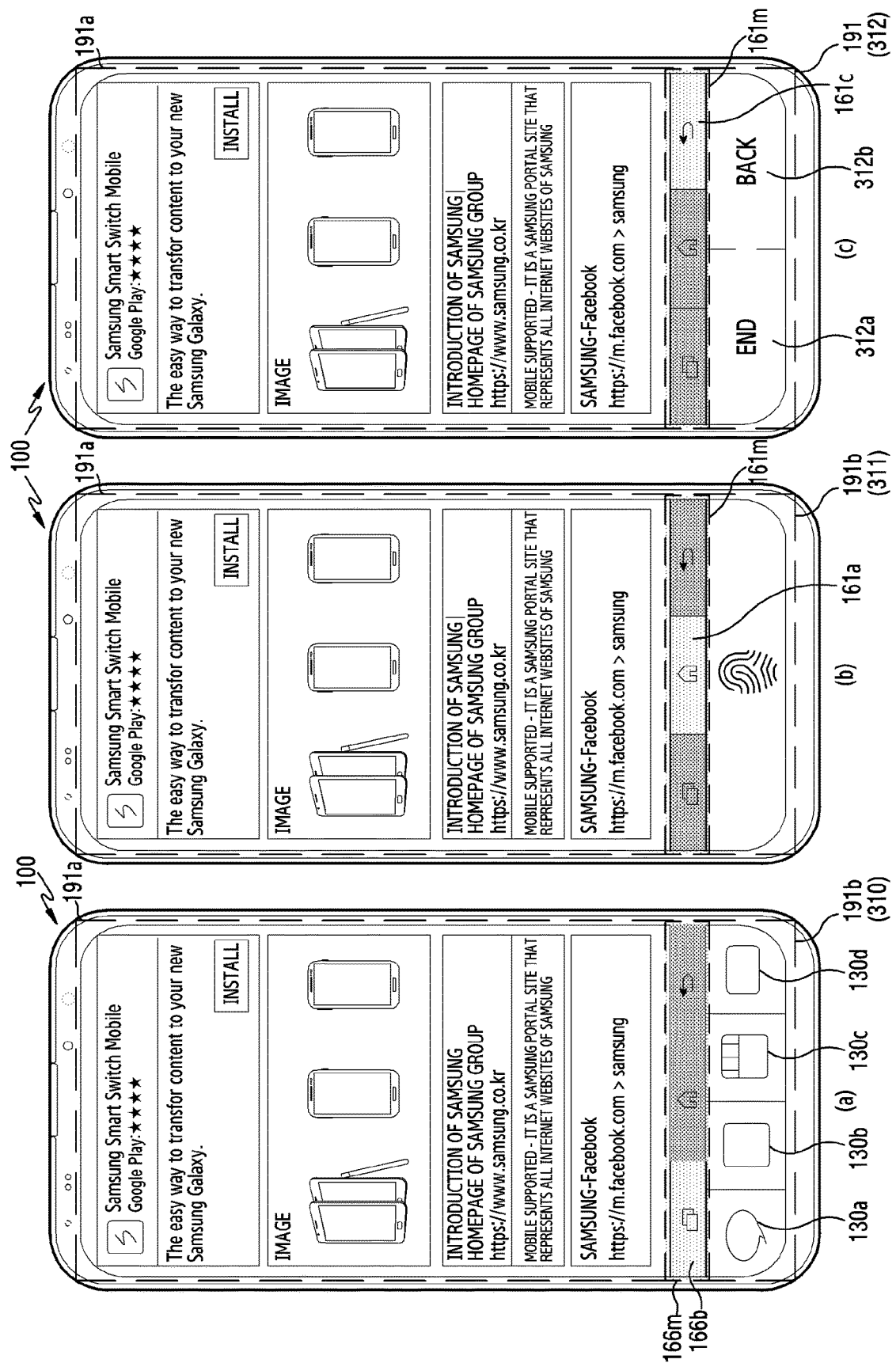

A shortcut icon (e.g., in a form of a reduced shortcut icon) such as the alpha screen icon 401 may be provided within not only the quick setting list 401 but also the home screen 191, or the soft button menu 161m including a soft button (e.g., one side of the recently executed app button 161 or one side of the back button 161c, see FIG. 6C).

A handle may be provided as well as the shortcut icon such as the alpha screen 401. An alpha screen handle may be provided as a handle provided to one side of the touch screen 190. The alpha screen handle may be a trigger.

The electronic device 100 may detect a user's force touch through a pressure sensor (not shown) of the sensor unit 170. The user may input the force touch (or a long press force touch) on a blank area (e.g., without a shortcut icon). The force touch (or the long press force touch) input may be a trigger. FIG. 5A to FIG. 5D illustrate examples of a screen display method of an electronic device according to another embodiment of the disclosure.

Referring to FIG. 5A to FIG. 5D, different feedbacks (or extension screens) are displayed on the same application according to characteristics of respective different third areas.

Figure 5A:
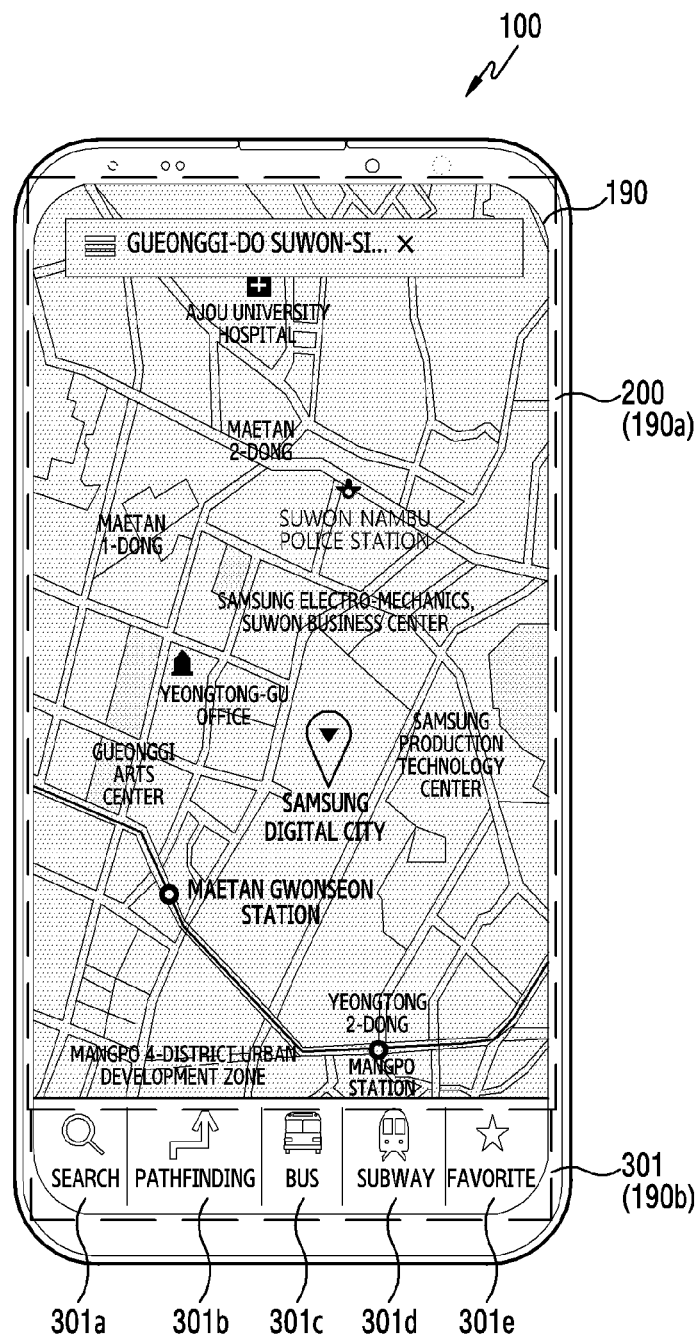
FIGS. 5A, 5B, 5C, and 5D illustrate examples of a screen display method of an electronic device according to another embodiment of the disclosure.

In FIG. 5A to FIG. 5D, an application screen displayed on the touch screen 190 may be the map application screen 200. In FIG. 5A, the application screen may be a home screen (or a first screen) of an application to be executed.

Referring to FIG. 5A, a user may input a trigger (e.g., a third user input, a shortcut icon selection, etc.) on the application screen 200. The control unit 110 may split a screen area into the first area 190a and the second area 190b in response to the trigger. In case of the home screen of the application, a third area may be identical to the first area 190a.

If the third area is identical to the first area 190a, the control unit 110 may identify a characteristic of the third area by using a unique identification (e.g., a home screen) of the first area.

The control unit 110 may provide a feedback (e.g., an extension function screen) to the second area in response to the characteristic (e.g., the home screen) of the third screen. For example, the feedback may be the selectable menu screen 301. A selectable item corresponding to the provided feedback may include, for example, a search 301a, a path-finding 301b, a bus 301c, a subway 301d, or a favorite 301e.

The user may select one of the items 301a to 301e displayed on the menu screen 301.

Figure 5B:
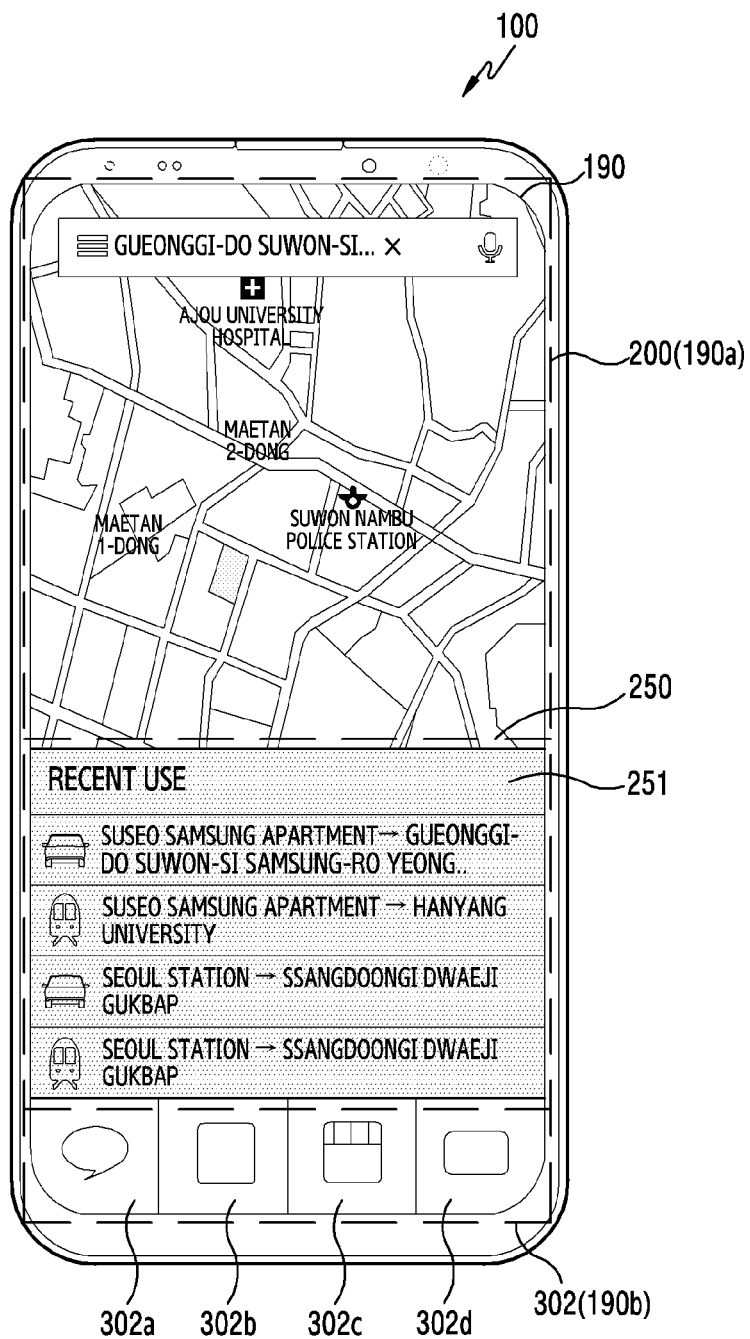

Referring to FIG. 5B, the user may input a trigger (e.g., a third user input, a shortcut icon selection, etc.) in the application screen 200 on which a third area 250 is displayed. The control unit 110 may split a screen area into the first area 190a and the second area 190b in response to the trigger. The third area 250 may be a search history screen 251.

The control unit 110 may identify a characteristic of the third area 250 by using a unique identification (e.g., a search history) of the search history screen 251.

The control unit 110 may provide a feedback (e.g., an extension function screen) to the second area in response to the characteristic (e.g., the search history) of the third screen. For example, the feedback may be a selectable SNS sharing screen 302. A selectable item corresponding to the provided feedback may include, for example, a first SNS application 302a, a second SNS application 302b, a third SNS application 302c, or a fourth SNS application 302d.

The user may select one of the items 302a to 302d displayed on the SNS sharing screen 302.

Figure 5C:
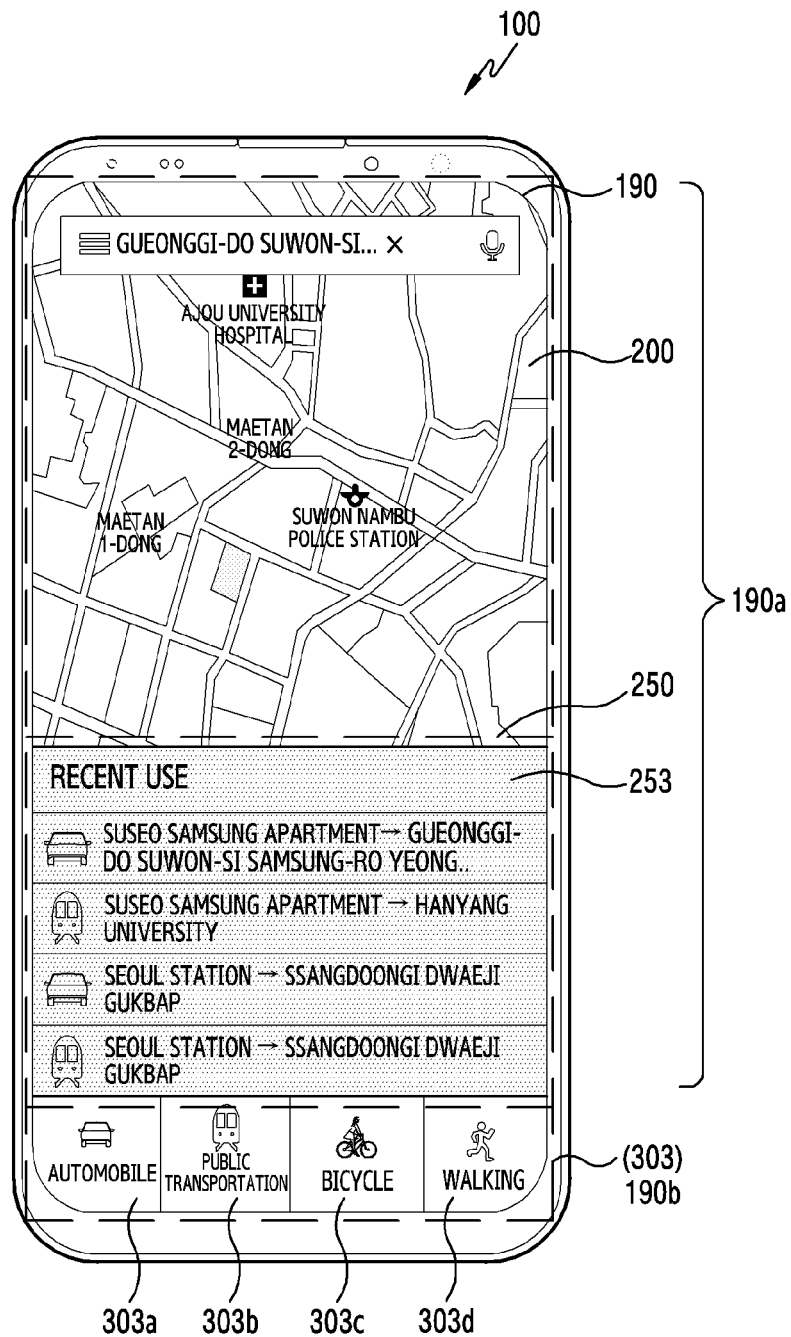

Referring to FIG. 5C, the user may input a trigger (e.g., the third user input, the shortcut icon selection, etc.) on the application screen 200 on which the third area 250 is displayed. The control unit 110 may divide the screen area into the first area 190a and the second area 190b in response to the trigger. The third area 250 may be the recent search history screen 251.

The control unit 110 may identify the characteristic of the third area 250 by using a unique identification (e.g., a recent search history) of the recent search history screen 251.

The control unit 110 may provide a feedback (e.g., an extension function screen) to the second area in response to the characteristic (e.g., the recent search history) of the third screen. For example, the feedback may be a selectable transportation means screen 303. A selectable item corresponding to the provided feedback may include, for example, an automobile 303a, a public transportation 303b, a bicycle 303c, or walking 303d.

The user may select one of the items 303a to 303d displayed on the transportation means screen 303.

Figure 5D:
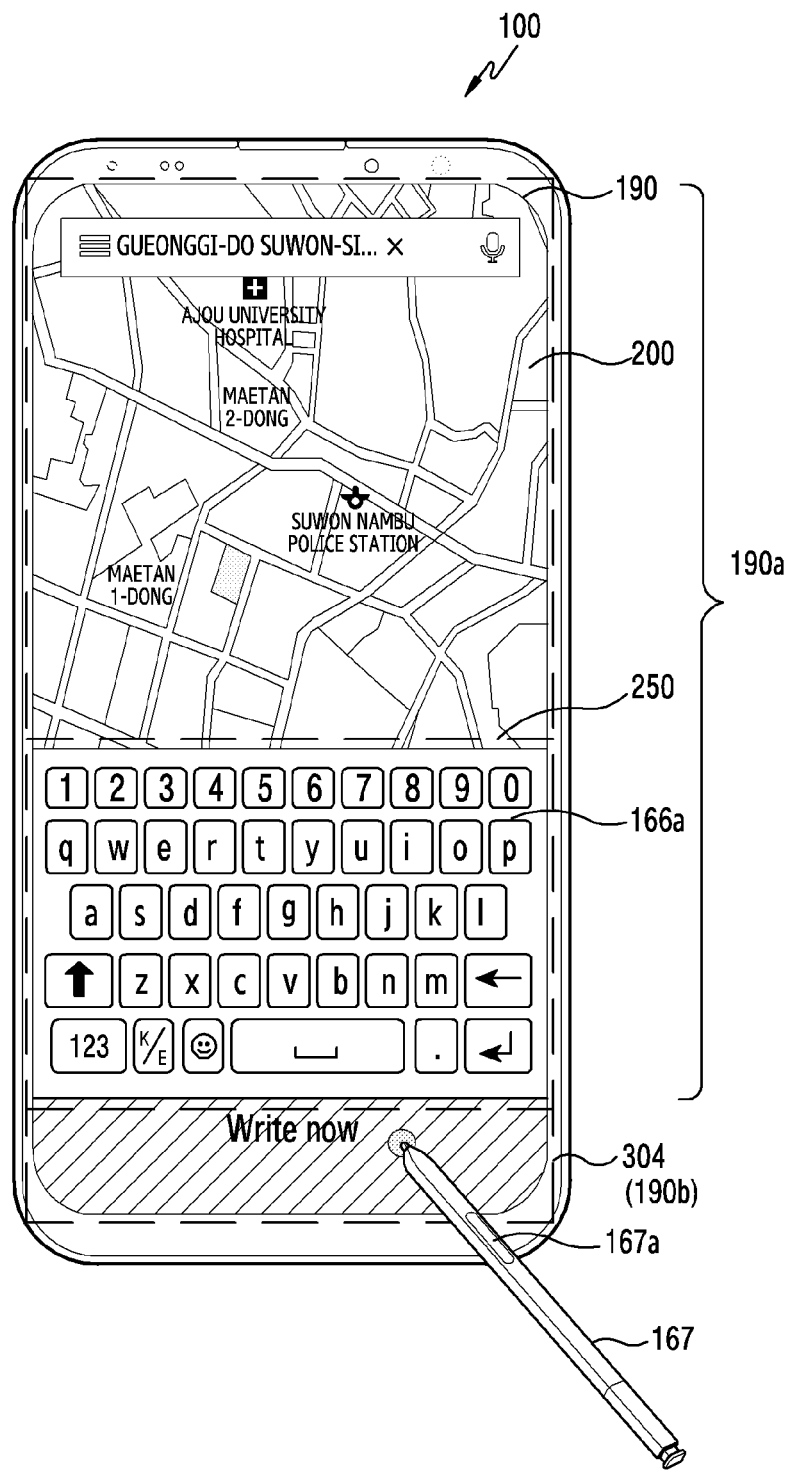

Referring to FIG. 5D, the user may input the trigger (e.g., the third user input, the shortcut icon selection, etc.) on the application screen 200 on which the third area 250 is displayed. The control unit 110 may divide the screen area into the first area 190a and the second area 190b in response to the trigger. The third area 250 may be the keypad 166a.

The control unit 110 may identify the characteristic of the third area 250 by using the unique identification (e.g., the keypad) of the keypad 166a.

In FIG. 5D, the control unit 110 may provide a feedback (e.g., an extension function screen) to the second area in response to the characteristic (e.g., the keypad) of the third screen. For example, the feedback may be the handwriting input screen 304 on which an input of the input pen 167 is possible. The user may handwrite on the handwriting input screen 304 by using the input pen 167.

FIG. 5D and FIG. 4E may differ in the extraction of the input pen 167. When the input pen 167 is extracted from the electronic device 100, the control unit 110 may detect the extraction of the input pen 167. The control unit 110 may detect whether an operation (or paring) of an accessory (e.g., an input pen or a short-range communication input device (e.g., a Bluetooth stylus, not shown), etc.) is performed before/after a trigger input. The aforementioned accessory is only one example, and various accessories corresponding to an application to be executed are not limited thereto.

When the input pen 167 is extracted from the electronic device 100 and when the trigger is input and the third area 250 is the keypad 166a, the control unit 110 may provide the handwriting input screen 304 to the second area instead of the voice recognition screen 301.

FIG. 6A to FIG. 6C illustrate examples of a screen display method according to another embodiment of the disclosure.

Referring to FIG. 6A to FIG. 6C, when each of different application screens is displayed on the first area 190a, a feedback (or an extension screen) is displayed on the second area 190b according to a characteristic of a third area.

In (a) and (b) of FIG. 6A, the second area 190b may be located at an upper end of the first area 190a, and an application screen displayed on the first area 190a may be the home screen 191 and an SNS application screen 210.

Referring to (a) and (b) of FIG. 6A, a user may input a trigger (e.g., a third user input, a shortcut icon selection, etc.) in each of the application screens 191 and 210. The control unit 110 may divide the screen area into the first area 190a and the second area 190b in response to the trigger.

The control unit 110 may display the second area 190b located at an upper end of the first area 190a according to a configuration (or according to a user input). In each of the application screens 191 and 210, a third area may be the status bar 192.

If the third area is the status bar 192 in each of the application screens 191 and 210, the control unit 110 may identify a characteristic of the third area by using a unique identification (e.g., a status bar) of the status bar 192.

The control unit 110 may provide a feedback (e.g., an extension function screen) to a second area at an upper end in response to the characteristic (e.g., the status bar) of the third screen. For example, the feedback may be a part of the shortcut icon 401 of the quick setting screen 400. The selectable shortcut icon 410 corresponding to the provided feedback may be displayed.

The user may select one of the shortcut icons 401 displayed on the quick setting screen 400.

In (a) and (b) of FIG. 6B, the second area 190b may be located at a lower end of the first area 190a, and an application screen displayed on the first area 190a may be the SNS application screen 210 and a text application screen 220.

Referring to (a) and (b) of FIG. 6A, the user may input a trigger (e.g., a third user input, a shortcut icon selection, etc.) in each of application screens 210 and 220. The control unit 110 may divide the screen area into the first area 190a and the second area 190b in response to the trigger.

The third areas displayed on the different application screens 210 and 220 of the first area 190a may correspond to different types of keypads 166a1 and 166a.

If the third areas correspond to the different types of keypads 166a1 and 166a in the different application screens 210 and 220, the control unit 110 may identify a characteristic of the third area by using a unique identification (e.g., a keypad) of the same keypad 166a.

The control unit 110 may provide a feedback (e.g., an extension function screen) to the second area in response to a characteristic (e.g., a keypad) of the third screen. For example, the feedback may be the voice input screen 301 as shown in FIG. 4E. A selectable shortcut icon 401 corresponding to the provided feedback may be displayed.

The user may utter via the microphone 162 corresponding to the voice input screen 301.

Referring to (a) and (c) of FIG. 6C, the user may input a trigger (e.g., a third user input, a shortcut icon selection, etc.) in the application screen 200 on which the third area 250 is displayed. The control unit 110 may split a screen area into the first area 190a and the second area 190b in response to the trigger. The third area 250 may be the soft button menu 161m. The soft button menu 161m may include the home button 161a, the recently executed app button 161b, and/or the back button 161c. In addition, the soft button menu 161m may further include an additional shortcut icon (e.g., an alpha screen, etc.).

The control unit 110 may identify a characteristic of the third area 250 by using a unique identification (e.g., a soft button) of the soft button menu 161m.

The control unit 110 may provide a feedback (e.g., an extension function screen) to the second area in response to the characteristic (e.g., a soft button) of the third screen. For example, a feedback corresponding to the recently executed app button 161b may be a selectable recently executed app list 310. A selectable item corresponding to the provided feedback may include, for example, a first application 310a, a second application 310b, a third application 310c, or a fourth application 310d. A feedback corresponding to the home button 161a may be a fingerprint recognition screen 311. In addition, a feedback corresponding to the back button 161c may be an end/back selection screen 312. A selectable item corresponding to the provided feedback may include an end 312a or a back 312b.

The user may select one of the items 310a to 312b displayed in the feedbacks 310 to 312.

In operation 350 of FIG. 3, if a feedback corresponding to a determined characteristic is provided to the second area, the screen display method of the electronic device ends.

Figure 7:
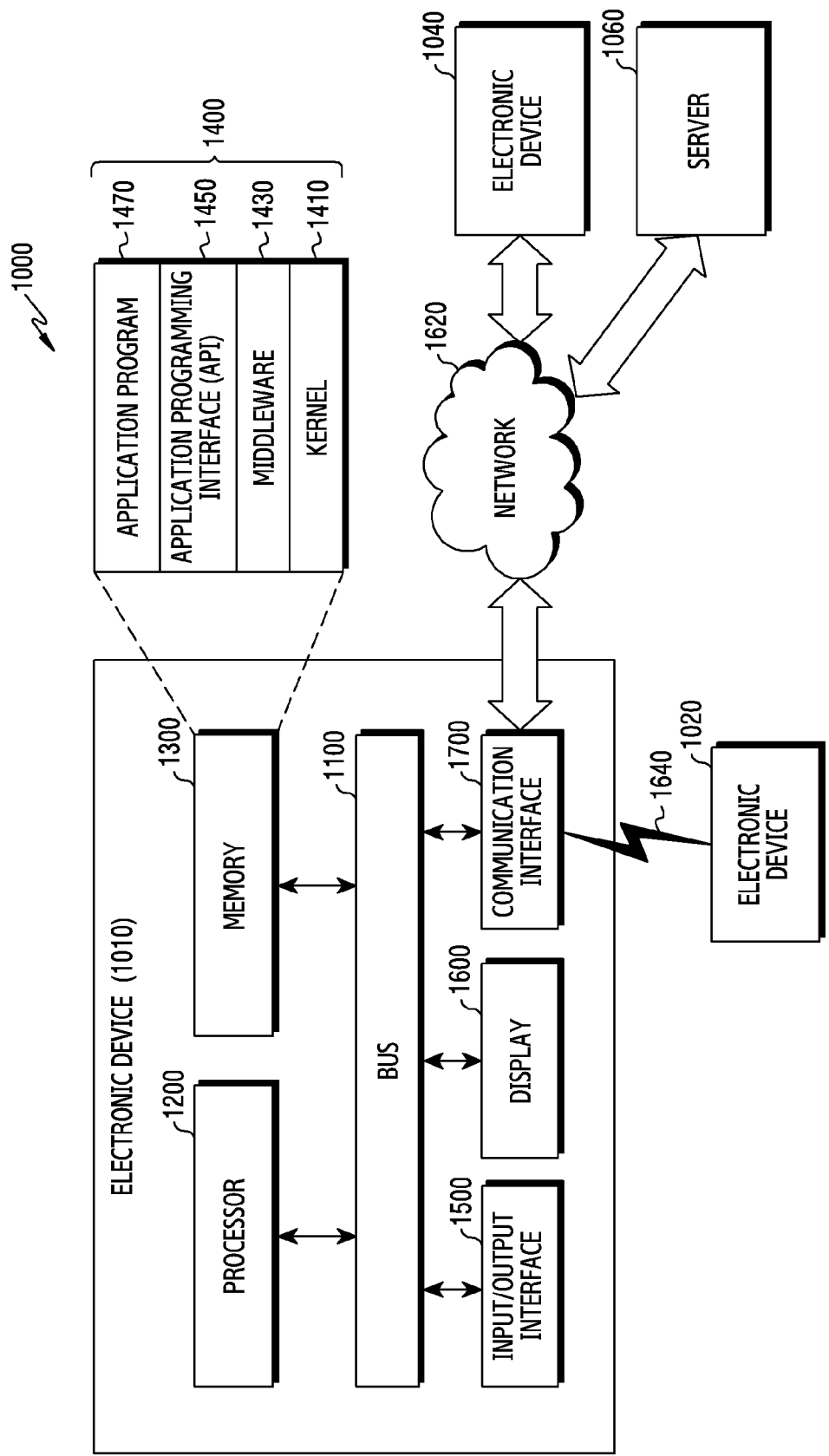
FIG. 7 illustrates a network environment including an electronic device according to various embodiments of the disclosure.

FIG. 7 illustrates a network environment including an electronic device according to various embodiments of the disclosure.

An electronic device 1010 in a network environment 1000 is disclosed according to various embodiments. The electronic device 1010 may include a bus 1100, a processor 1200, a memory 1300, an input/output interface 1500, a display 1600, and a communication interface 1700. In some embodiments, the electronic device 1010 may omit at least one of the aforementioned components or may additionally include other components. The bus 1100 may include a circuit for connecting the aforementioned components 1100 to 1700 to each other and for delivering communication (e.g., a control message and/or data) between the aforementioned components.

The processor 1200 may include one or more of a Central Processing Unit (CPU), an application processor, and a Communication Processor (CP). The processor 1200 may control, for example, at least one of other components of the electronic device 1010 and/or may execute an arithmetic operation or data processing for communication.

Referring to FIG. 7 and FIG. 2, the processor 1200 of FIG. 7 may correspond to the control unit 110 of FIG. 2. Referring to FIG. 7 and FIG. 2, the processor 1200 of FIG. 7 may correspond to the processor 111 of FIG. 2. The electronic device 1010 of FIG. 7 may correspond to the electronic device 100 of FIG. 2.

The memory 1300 may include a volatile and/or non-volatile memory. For example, the memory 1300 may store instructions or data related to at least one different components of the electronic device 1010. According to an embodiment, the memory 1300 may store a software and/or a program 1400. Referring to FIG. 7 and FIG. 2, the memory 1300 of FIG. 7 may correspond to the storage unit 175 of FIG. 2.

For example, the program 1400 may include a kernel 1410, a middleware 1430, an Application Programming Interface (API) 1450, or an application program (or "application") 1470. At least some of the kernel 1410, the middleware 1430, and the API 1450 may be referred to as an Operating System (OS).

For example, the kernel 1410 may control or manage system resources (e.g., the bus 1100, the processor 1200, the memory 1300, etc.) used to execute an operation or function implemented in other programs (e.g., the middleware 1430, the API 1450, or the application program 1470). In addition, the kernel 1410 may also provide an interface capable of controlling or managing system resources by accessing individual components of the electronic device 1010 in the middleware 1430, the API 1450, or the application program 1470.

For example, the middleware 1430 may play an intermediary role so that the API 1450 or the application program 1470 exchanges data by communicating with the kernel 1410. In addition, the middleware 1430 may also handle one or more task requests received from the application program 1470 according to a priority. For example, the middleware 1430 may handle one or more task requests by assigning a priority that can be used in a system resource (e.g., the bus 1100, the processor 1200, the memory 1300, etc.) of the electronic device 1010 to at least one of the application programs 1470.

As an interface used by the application program 1470 to control a function provided from the kernel 1410 or the middleware 1430, the API 1450 may include, for example, at least one interface or function (e.g., command) for file control, window control, image processing, text control, or the like.

The input/output interface 1500 may transfer, for example, instructions or data input from a user or a different external device to different component(s) of the electronic device 1010, or may output the instructions or data received from the different component(s) of the electronic device 1010 to the user or the different external device. Referring to FIG. 7A and FIG. 2, the input/output interface 1500 of FIG. 7 may correspond to the entirety or part of the input/output unit 160 of FIG. 2.

For example, the display 1600 may include a Liquid Crystal Display (LCD), a Light Emitting Diode (LED) display, an Organic Light-Emitting Diode (OLED) display, a Micro Electro Mechanical System (MEMS) display, or an electronic paper display. The display 1600 may display a variety of content (e.g., text, image, video, icon, and/or symbol, etc.) to the user. The display 1600 may include a touch screen, and may receive a touch, gesture, proximity, or hovering input, for example, by using an electronic pen or a portion of a user's body through the touch panel. Referring to FIG. 7 and FIG. 2, the display 1600 of FIG. 7 may correspond to the touch screen 190 of FIG. 2.

The communication interface 1700 may establish communication, for example, between the electronic device 1010 and an external device (e.g., the first external electronic device 1020, the second external electronic device 1040, or the server 1060). For example, the communication interface 1700 may be coupled to a network 1620 through wireless or wired communication to communicate with the external device (e.g., the second external electronic device 1040 or the server 1060). Referring to FIG. 7 and FIG. 2, the communication interface 1700 of FIG. 7 may correspond to the communication unit 120 or 130 of FIG. 2. The interface 1700 of FIG. 7 may correspond to the connector 165 of FIG. 2.

The wireless communication may include, for example, cellular communication using at least one of LTE, LTE Advance (LTE-A), Code Division Multiple Access (CDMA), Wideband CDMA (WCDMA), Universal Mobile Telecommunications System (UMTS), Wireless Broadband (WiBro), Global System for Mobile Communications (GSM), and the like. According to an embodiment, the wireless communication may include, for example, at least one of Wireless Fidelity (WiFi), Bluetooth, Bluetooth Low Energy (BLE), Zigbee, Near Field Communication (NFC), magnetic secure transmission, Radio Frequency (RF), and Body Area Network (BAN).

According to an embodiment, the wireless communication may include a Global Navigation Satellite System (GNSS). For example, the GNSS may be a Global Positioning System (GPS), a Global Navigation Satellite System (Glonass), a Beidou Navigation Satellite System (or Beidou), or the European global satellite-based navigation system (or Galileo). Hereinafter, the "GPS" and the "GNSS" may be interchangeably used in the disclosure.

The wired communication may include, for example, at least one of Universal Serial Bus (USB), High Definition Multimedia Interface (HDMI), Recommended Standard-232 (RS-232), power-line communication, Plain Old Telephone Service (POTS), and the like.

The network 1620 may include at least one of a telecommunications network, e.g., a computer network (e.g., LAN or WAN), the Internet, and a telephone network.

Each of the first and second external electronic devices 1020 and 1040 may be identical or different types of device with respect to the electronic device 1010. According to various embodiments, all or some of operations performed in the electronic device 1010 may be performed in one or a plurality of different electronic devices (e.g., the electronic devices 1020 and 1040, or the server 1060).

According to an embodiment, if the electronic device 1010 needs to perform a certain function or service either automatically or at a request, the electronic device 1010 may request at least a part of functions related thereto alternatively or additionally to a different electronic device (e.g., the electronic device 1020 or 1040 or the server 1060) instead of executing the function or the service autonomously. The different electronic device (e.g., the electronic device 1020 or 1040 or the server 1060) may execute the requested function or additional function, and may deliver a result thereof to the electronic device 1010. The electronic device 1010 may provide the requested function or service either directly or by additionally processing the received result. For this, for example, a cloud computing, distributed computing, or client-server computing technique may be used.

Figure 8:
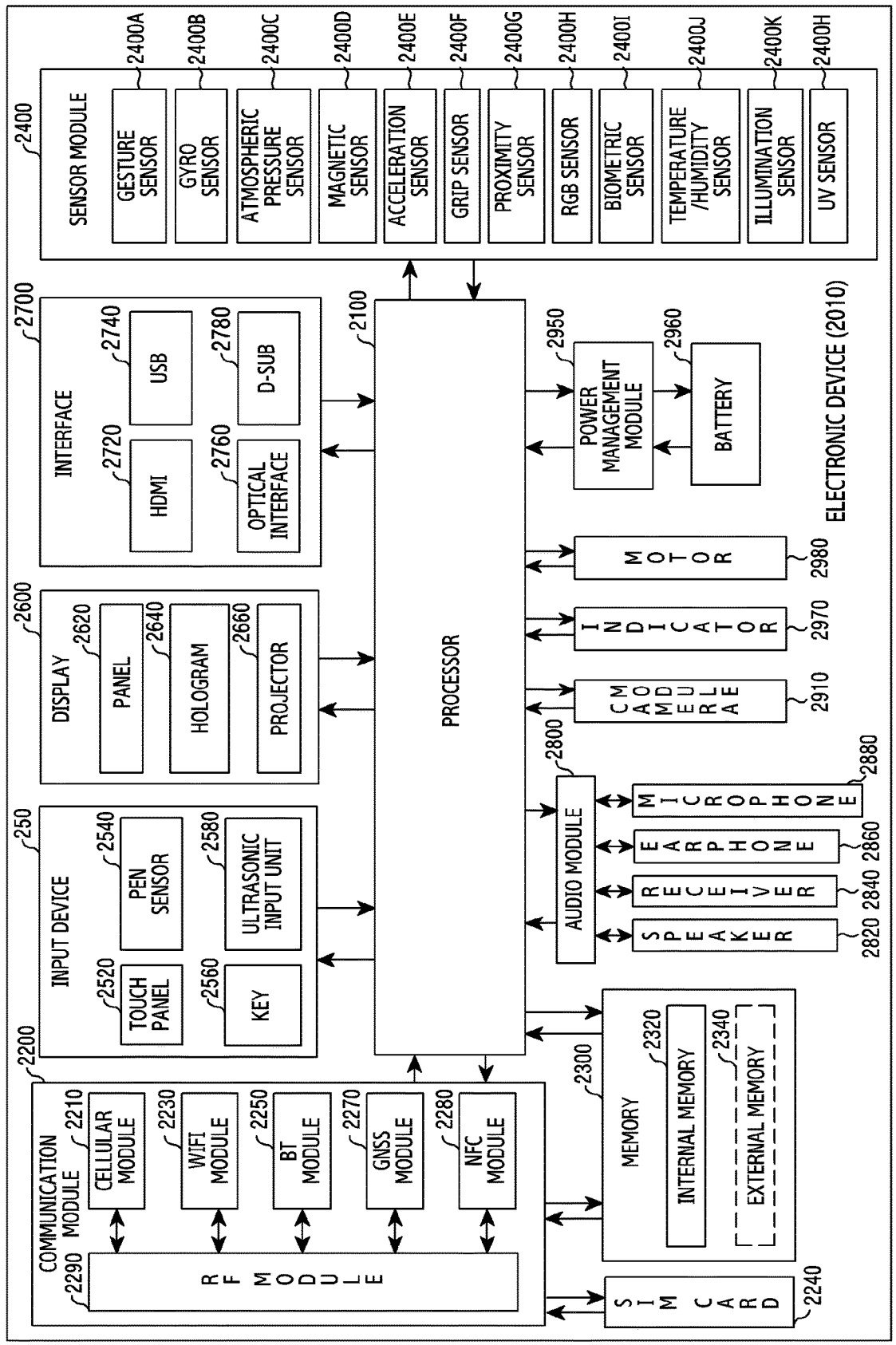
FIG. 8 is a block diagram of an electronic device according to various embodiments.

FIG. 8 is a block diagram of an electronic device according to various embodiments.

An electronic device 2010 may include, for example, the entirety or part of the electronic device 1010 of FIG. 7. The electronic device 2010 may include one or more processors (e.g., Application Processors (APs)) 2100, a communication module 2200, a subscriber identity module 2240, a memory 2300, a sensor module 2400, an input unit 2500, a display 2600, an interface 2700, an audio module 2800, a camera unit 2910, a power management module 2950, a battery 2960, an indicator 2970, and a motor 2980. Referring to FIG. 8 and FIG. 2, the electronic device 2010 may include, for example, the entirety or part of the electronic device 100 of FIG. 2.

The processor 2100 may control a plurality of hardware or software components coupled with the processor 2100 by driving, for example, an operating system or an application program, and may perform various data processing and computations. The processor 2100 may be implemented with, for example, a System on Chip (SoC). According to an embodiment, the processor 210 may further include a Graphic Processing Unit (GPU) and/or an image signal processor.

The processor 2100 may include at least a part (e.g., a cellular module 2210) of the aforementioned components of FIG. 2. The processor 2100 may process a command or data, which is received from at least one of different components (e.g., a non-volatile memory), by loading it to a volatile memory and may store a variety of data in the non-volatile memory. Referring to FIG. 8 and FIG. 2, the processor 2100 of FIG. 8 may correspond to the control unit 110 of FIG. 2. The processor 2100 of FIG. 8 may correspond to the processor 111 of FIG. 2.

The communication module 2200 may have the same or similar structure of, for example, the communication interface 1700. The communication module 2200 may include, for example, the cellular module 2210, a WiFi module 2230, a BlueTooth (BT) module 2250, a GNSS module 2270, a Near Field Communication (NFC) module 2280, and a Radio Frequency (RF) module 2290. The cellular module 2210 may provide a voice call, a video call, a text service, an Internet service, or the like, for example, through a communication network. Referring to FIG. 8 and FIG. 2, the communication module 2200 of FIG. 8 may correspond to the communication unit 120 or 130 of FIG. 2.

According to an embodiment, the cellular module 2210 may identify and authenticate the electronic device 2010 in the communication network by using the subscriber identity module (e.g., a SIM card) 2240. According to an embodiment, the cellular module 2210 may perform at least some functions that can be provided by the processor 2100. According to an embodiment, the cellular module 2210 may include a Communication Processor (CP). According to some embodiments, at least some (e.g., two or more) of the cellular module 2210, the WiFi module 2230, the BT module 2250, the GPS module 2270, and the NFC module 2280 may be included in one Integrated Chip (IC) or IC package.

The RF module 2290 may transmit/receive, for example, a communication signal (e.g., a Radio Frequency (RF) signal). The RF module 2290 may include, for example, a transceiver, a Power Amp Module (PAM), a frequency filter, a Low Noise Amplifier (LNA), an antenna, or the like. According to another embodiment, at least one of the cellular module 2210, the WiFi module 2230, the BT module 2250, the GPS module 2270, and the NFC module 2280 may transmit/receive an RF signal via a separate RF module.

The subscriber identity module 2240 may include, for example, a card including a subscriber identity module or an embedded SIM, and may include unique identification information (e.g., an Integrated Circuit Card IDentifier (ICCID)) or subscriber information (e.g., an International Mobile Subscriber Identity (IMSI)).

The memory 2300 (e.g., the memory 1300) may include, for example, an internal memory 2320 or an external memory 2340. The internal memory 2320 may include, for example, at least one of a volatile memory (e.g., a Dynamic RAM (DRAM), a Static RAM (SRAM), a Synchronous Dynamic RAM (SDRAM), etc.) and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory, a NOR flash memory, etc.), a hard drive, or a Solid State Drive (SSD)).

The external memory 2340 may further include a flash drive, for example, Compact Flash (CF), Secure Digital (SD), Micro Secure Digital (Micro-SD), Mini Secure digital (Mini-SD), extreme Digital (xD), memory stick, or the like. The external memory 2340 may be operatively and/or physically coupled with the electronic device 2010 via various interfaces. Referring to FIG. 8 and FIG. 2, the memory 2300 of FIG. 8 may correspond to the storage unit 175 of FIG. 2.

The sensor module 2400 may measure, for example, physical quantity or detect an operating state of the electronic device 2010, and may convert the measured or detected information into an electric signal.

The sensor module 2400 may include, for example, at least one of a gesture sensor 2400A, a gyro sensor 2400B, a pressure sensor 2400C, a magnetic sensor 2400D, an acceleration sensor 2400E, a grip sensor 2400F, a proximity sensor 2400G, a color sensor 2400H (e.g., a Red, Green, Blue (RGB) sensor), a bio sensor 2400I, a temperature/humidity sensor 2400J, an illumination sensor 2400K, and an Ultra Violet (UV) sensor 2400M. Additionally or alternatively, the sensor module 2400 may include, for example, an E-nose sensor, an ElectroMyoGraphy (EMG) sensor, an ElectroEncephaloGram (EEG) sensor, an ElectroCardioGram (ECG) sensor, an Infrared (IR) sensor, an iris sensor, and/or a fingerprint sensor.

The sensor module 2400 may further include a control circuit for controlling at least one or more sensors included therein. In some embodiments, the electronic device 2010 may further include a processor configured to control the sensor module 2040 either separately or as a part of the processor 2100, and may control the sensor module 2400 while the processor 2100 is in a sleep state. Referring to FIG. 8 and FIG. 2, the sensor module 240 of FIG. 8 may correspond to the sensor unit 160 of FIG. 2.

The input unit 2500 may include, for example, a touch panel 2520, a (digital) pen sensor 2540, a key 2560, or an ultrasonic input unit 2580.

The touch panel 2520 may recognize a touch input, for example, by using at least one of an electrostatic type, a pressure-sensitive type, and an ultrasonic type. The touch panel 2520 may further include a control circuit. The touch penal 2520 may further include a tactile layer and thus may provide the user with a tactile reaction.

The (digital) pen sensor 2540 may be implemented, for example, by using the same or similar method of receiving a touch input of the user or by using an additional sheet for recognition.

The key 2560 may be, for example, a physical button, an optical key, a keypad, or a touch key.

The ultrasonic input unit 2580 may use a microphone (e.g., a microphone 2880) to sense an ultrasonic wave generated in an input means, and may identify data corresponding to the sensed ultrasonic wave. Referring to FIG. 8 and FIG. 2, the input unit 2500 of FIG. 8 may correspond to some parts 161, 162, and 166 of the input/output unit 160 of FIG. 2.

The display 2600 (e.g., the display 1600) may include a panel 2620, a hologram 2640, a projector 2660, and/or a control circuit for controlling these elements. In addition, the display 2600 may include one flexible touch screen (or one flexible display).

The panel 2620 may be implemented, for example, in a flexible, transparent, or wearable manner. The panel 2620 may be constructed of the touch panel 2520 and at least one module. According to an embodiment, the panel 2620 may include a pressure sensor (or a force sensor) capable of measuring strength of pressure for a user's touch. The pressure sensor may be implemented integrally with the touch panel 2520, or may be implemented as at least one sensor separated from the touch panel 2520.

The hologram 2640 may use an interference of light and show a stereoscopic image in the air.

The projector 2660 may display an image by projecting a light beam onto a screen. The screen may be located, for example, inside or outside the electronic device 2010. Referring to FIG. 8 and FIG. 2, the display 2600 of FIG. 8 may correspond to the touch screen 190 of FIG. 2.

The interface 2700 may include, for example, a High-Definition Multimedia Interface (HDMI) 2720, a Universal Serial Bus (USB) 2740, an optical communication interface 2760, or a D-subminiature (D-sub) 2780. The interface 2700 may be included, for example, in the communication interface 1700 of FIG. 7. Additionally or alternatively, the interface 2700 may include, for example, a Mobile High-definition Link (MHL) interface, a Secure Digital (SD)/Multi-Media Card (MMC) interface, or an Infrared Data Association (IrDA) standard interface. Referring to FIG. 8 and FIG. 2, the interface 2700 of FIG. 8 may correspond to the connector 166 of the input/output unit 160 of FIG. 2.

The audio module 2800 may bilaterally convert, for example, a sound and electric signal. At least some components of the audio module 2800 may be included in, for example, the input/output interface 1450 of FIG. 7. The audio module 2800 may convert sound information which is input or output, for example, through a speaker 2820, a receiver 2840, an earphone 2860, the microphone 2880, or the like. The receiver 2840 may include the speaker 2820. Referring to FIG. 8 and FIG. 2, a part of the audio module 2800 of FIG. 8 may correspond to the speaker 163 of the input/output unit 160 of FIG. 2.

The camera module 2910 is, for example, a device for image and video capturing, and according to an embodiment, may include one or more image sensors (e.g., a front sensor or a rear sensor), a lens, an Image Signal Processor (ISP), or a flash (e.g., LED or xenon lamp). Referring to FIG. 8 and FIG. 2, the camera module 2910 of FIG. 8 may correspond to the camera 150 of FIG. 2.

The power management module 2950 may manage, for example, power of the electronic device 2010. According to an embodiment, the power management module 2950 may include a Power Management Integrated Circuit (PMIC), a charger Integrated Circuit (IC), or a battery fuel gauge. The PMIC may have a wired and/or wireless charging type. The wireless charging type may include, for example, a magnetic resonance type, a magnetic induction type, an electromagnetic type, or the like, and may further include an additional circuit for wireless charging, for example, a coil loop, a resonant circuit, a rectifier, or the like. The battery gauge may measure, for example, residual quantity of the battery 2960 and voltage, current, and temperature during charging. The battery 2960 may include, for example, a rechargeable battery and/or a solar battery. Referring to FIG. 8 and FIG. 2, the power management module 2950 may correspond to the power supply unit 180 of FIG. 2.

The indicator 2970 may indicate a specific state, for example, a booting state, a message state, a charging state, or the like of the electronic device 2010 or a part thereof (e.g., the processor 2100).

The motor 2980 may convert an electric signal into a mechanical vibration, and may generate a vibration or haptic effect. Referring to FIG. 8 and FIG. 2, the motor 2980 of FIG. 8 may correspond to the vibration motor 164 of the input/output unit 160 of FIG. 2.

The electronic device 2010 may include a mobile TV supporting device (e.g., a GPU) capable of processing media data according to a protocol of, for example, Digital Multimedia Broadcasting (DMB), Digital Video Broadcasting (DVB), mediaFlo™, or the like.

Each of the components described in the disclosure may consist of one or more components, and names thereof may vary depending on a type of electronic device. In the electronic device (e.g., the electronic device 2010) according to various embodiments, some of the components may be omitted, or additional other components may be further included. Further, some of the components of the electronic device according to various embodiments may be combined and constructed as one entity, so as to equally perform functions of corresponding components before combination.

Figure 9:
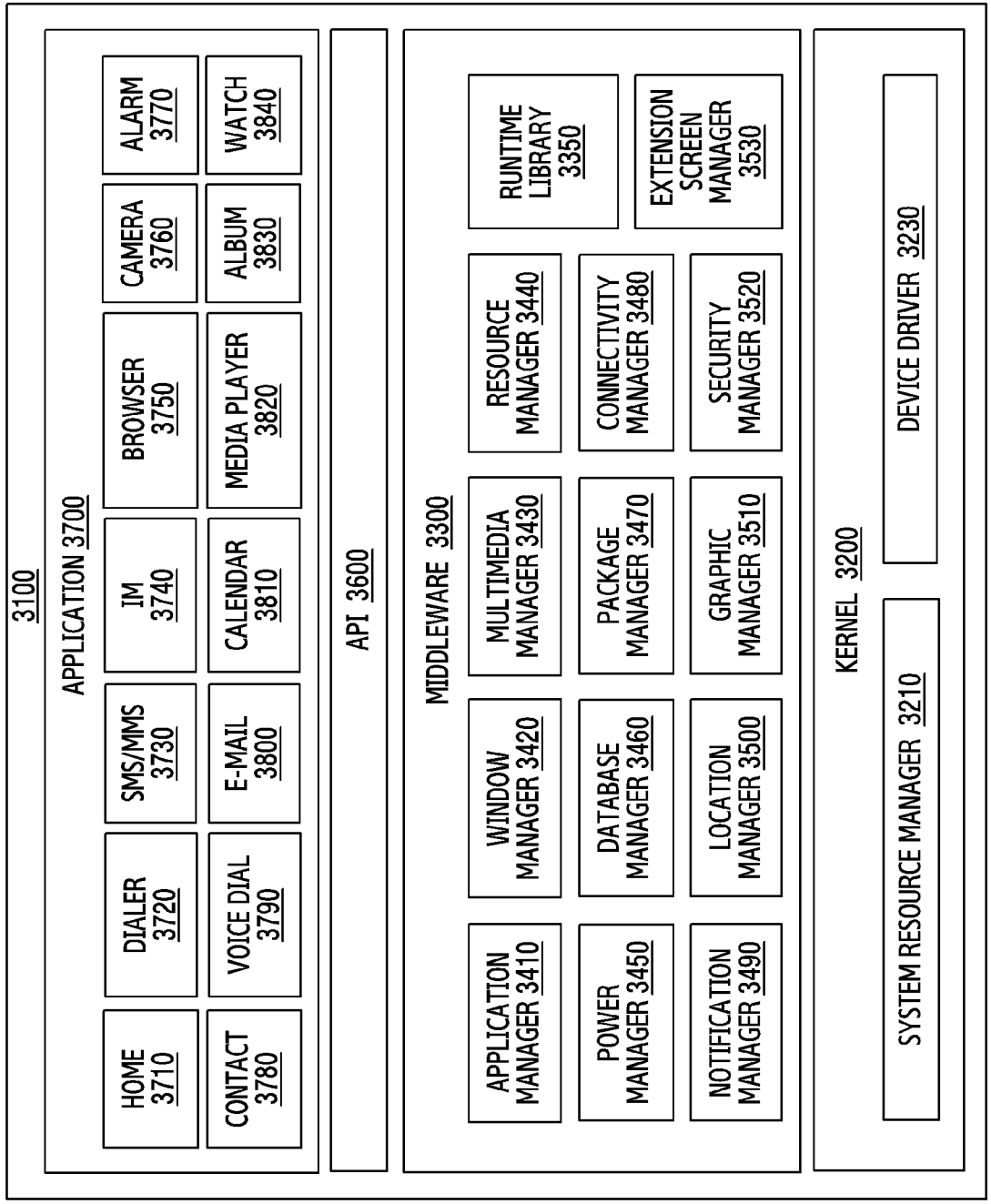
FIG. 9 is a block diagram of a program module according to various embodiments.

FIG. 9 is a block diagram of a program module according to various embodiments.

According to an embodiment, a program module 3100 (e.g., the program 1400) may include an Operating System (OS) for controlling a resource related to an electronic device (e.g., the electronic device 1010) or various applications (e.g., the application 1470) driven on the OS. The OS may be, for example, Android™, iOS™, Windows™, Symbian™, Tizen™, or Bada™. Referring to FIG. 9, the programming module 3100 may include a kernel 3200 (e.g., the kernel 1410), a middleware 3300 (e.g., the middleware 1430), an Application Programming Interface (API) 3600 (e.g., the API 1450), and/or an application 3700 (e.g., the application program 1470). At least a part of the program module 3100 can be preloaded on the electronic device, or can be downloaded from an external electronic device (e.g., the electronic devices 1020 and 1040, the server 1060, etc.).

The kernel 3200 may include, for example, a system resource manager 3210 or a device driver 3230. The system resource manager 3210 may perform control, allocation, retrieval, or the like of the system resource. According to an embodiment, the system resource manager 3210 may include a process managing unit, a memory managing unit, a file system managing unit, or the like. The device driver 3230 may include, for example, a display driver, a camera driver, a Bluetooth driver, a shared memory driver, a USB driver, a keypad driver, a WiFi driver, an audio driver, or an Inter-Process Communication (IPC) driver. The middleware 3300 may provide, for example, a function commonly required by the application 3700, or may provide various functions through the API 3600 so that the application 3700 can effectively use a limited system resource in the electronic device. According to an embodiment, the middleware 3300 may include at least one of a runtime library 3350, an application manager 3410, a window manager 3420, a multimedia manager 3430, a resource manager 3440, a power manager 3450, a database manager 3460, a package manager 3470, a connectivity manager 3480, a notification manager 3490, a location manager 3500, a graphic manager 3510, a security manager 3520 and a extension screen manager 3530.

The runtime library 3350 may include, for example, a library module used by a compiler to add a new function through a programming language while the application 3700 is executed. The runtime library 3350 may perform an operation of an input/output management, a memory management, an arithmetic function, or the like. The application manager 3410 may manage, for example, a life cycle of the applications 3700. The window manager 3420 may manage a Graphic User Interface (GUI) resource used in a screen. The multimedia manager 3430 may recognize a format required to reproduce various media files, and may use a codec suitable for the format to perform encoding or decoding of the media file. The resource manager 3440 may manage a source code or memory space of the applications 3700. The power manager 3450 may manage, for example, a battery or power, and may provide power information or the like required for the operation. According to an embodiment, the power manager 3450 may interwork with a Basic Input/Output System (BIOS). The database manager 3460 may generate, search, or change a database to be used, for example, in the application 3700. The package manager 3470 may manage an installation or update of an application distributed in a form of a package file.

The connectivity manager 3480 may manage, for example, a wireless connection. The notification manager 3490 may provide a user with an event such as an incoming message, an appointment, a proximity notification, or the like. The location manager 3500 may manage, for example, location information of the electronic device. The graphic manager 3510 may manage, for example, a graphic effect to be provided to the user or a user interface related thereto. The security manager 3520 may provide, for example, system security or user authentication. According to an embodiment, the middleware 3300 may further include a telephony manager for managing a voice or video telephony function of the electronic device or a middleware module capable of constructing a combination of various functions of the aforementioned components. According to an embodiment, the middleware 3300 may provide a module specified for each type of operating system. The middleware 3300 may dynamically delete some of the existing components or may add new components. The API 3600 is, for example, a set of API programming functions, and may be provided with other configurations according to an operating system. For example, in case of Android or IOS, one API set may be provided for each platform, and in case of Tizen, two or more API sets may be provided.

The application 3700 may include one or more applications capable of providing a function of, for example, a home 3710, a dialer 3720, a Short Message Service (SMS)/Multimedia Messaging Service (MMS) 3730, an Instant Message (IM) 3740, a browser 3750, a camera 3760, an alarm 3770, a contact 3780, a voice dial 3790, an e-mail 3800, a calendar 3810, a media player 3820, an album 3830, a clock 3840, a health care (e.g., an application for measuring a physical activity level, a blood sugar level, etc.), or providing of environment information (e.g., providing of atmospheric pressure, humidity, or temperature information). According to an embodiment, the application 3700 may include an information exchange application capable of supporting information exchange between the electronic device and an external electronic device. The information exchange application may include, for example, a notification relay application for relaying specific information to the external electronic device or a device management application for managing the external electronic device. For example, the notification relay application may relay notification information generated in another application of the electronic device to the external electronic device, or may receive notification information from the external electronic device and may provide it to the user. The device management application may install, delete, or update, for example, a function (e.g., turning on/turning off the external electronic device itself (or some components thereof) or adjusting of a display illumination (or a resolution)) of an external electronic device which communicates with the electronic device, or an application which operates in the external electronic device. According to an embodiment, the application 3700 may include an application specified according to an attribute (e.g., a healthcare application of a mobile medical device) of the external electronic device. According to an embodiment, the application 3700 may include an application received from the external electronic device. At least a part of the program module 3100 may be implemented (e.g., executed) in software, firmware, hardware (e.g., the processor 2100), or at least two or more of combinations thereof, and may include modules, programs, routines, sets of instructions, processes, or the like for performing one or more functions.

A term "module" used in the disclosure may include a unit configured of hardware, software, or firmware. For example, the module may be interchangeably used with a term such as a logic, a logical block, a component, a circuit, or the like. The "module" may be an integrally constituted component or a minimum unit for performing one or more functions or may be a part thereof. The "module" may be mechanically or electrically implemented. For example, the "module" of the disclosure may include at least one of an Application-Specific Integrated Circuit (ASIC) chip, a Field-Programmable Gate Arrays (FPGAs), and a programmable-logic device, which are known or will be developed and which perform certain operations. At least a part of a device (e.g., modules or functions thereof) or method (e.g., operations) according to various embodiments may be implemented with an instruction stored in a computer-readable storage media (e.g., the memory 130). If the instruction is executed by one or more processors (e.g., the processor 120), the one or more processors may perform a function corresponding to the instruction. The computer-readable storage media may be, for example, the memory 130. The computer readable recording medium may include a hard disk, a floppy disk, magnetic media (e.g., a magnetic tape), optical media (e.g., a Compact Disc-ROM (CD-ROM), a Digital Versatile Disc (DVD), magnetic-optic media (e.g., a floptical disk)), an internal memory, or the like. The instruction may include a code created by a compiler or a code executable by an interpreter. The module or programming module according to various embodiments may further include at least one or more components among the aforementioned components, or may omit some of them, or may further include additional other components. Operations performed by a module, programming module, or other components according to various embodiments may be executed in a sequential, parallel, repetitive, or heuristic manner. Further, some of the operations may be executed in a different order or may be omitted, or other operations may be added.

An electronic device according to an embodiment of the disclosure includes an extended touch screen which displays an application screen and a processor which controls the touch screen. The processor divides the extended touch screen into a first area and a second area in response to a user input, and provides a feedback corresponding to an extension function of a characteristic area to the second area according to a determined characteristic of the characteristic area between the first area and the second area.

According to an aspect of the disclosure, the extension of the extended touch screen may include an extension of a vertical rate of an aspect ratio.

According to an aspect of the disclosure, the characteristic may be determined through an identification of the characteristic area.

According to an aspect of the disclosure, a size of the first area may be greater than a size of the second area.

According to an aspect of the disclosure, at least one or two second areas may be implemented.

According to an aspect of the disclosure, the second area may be located at one of an upper end and lower end of the extended touch screen.

According to an aspect of the disclosure, the second area may be moved by a user.

According to an aspect of the disclosure, the characteristic area may include a keypad, a status bar, or a soft button.

According to an aspect of the disclosure, a size of the second area may be greater than a size of the status bar.

According to an aspect of the disclosure, a functional extension of the characteristic area provided to the second area may include voice recognition, motion recognition, handwriting recognition, SNS sharing, or fingerprint recognition.

According to an aspect of the disclosure, a feedback provided to the second area may differ depending on an application displayed on the first area.

According to an aspect of the disclosure, the user input may include one of a touch, a touch gesture, selection of a shortcut icon, and short icon selection from a quick setting list.

According to an aspect of the disclosure, the method may further include providing an additional feedback corresponding to the feedback. The additional feedback may include at least one of a visual feedback, an auditory feedback, and a tactile feedback.

According to various embodiments of the disclosure, an electronic device capable of increasing screen usability and improving user convenience by providing an extension function to a second area on the basis of a characteristic of a characteristic area in first and second areas of an extended touch screen, and a screen display method of the electronic device.

Methods according to an exemplary embodiment of the disclosure may be recorded in a computer readable medium by being implemented in a form of a program instruction executable via various computers. The computer readable medium may include a program instruction, a data file, a data structure, etc., in an independent or combined manner. For example, irrespective of whether it can be deleted or re-recorded, the computer readable medium may be stored in a volatile or non-volatile storage device such as a ROM or the like, or, for example, a memory such as a RAM, a memory chip device, or an integrated circuit, or, for example, a optically or magnetically recordable and machine (e.g., computer) readable storage medium such as a CD, a DVD, a magnetic disc, a magnetic tape.

The memory that can be included in the electronic device is an example of a program including instructions implementing embodiments of the disclosure or a machine readable storage medium appropriate to store the programs. A program instruction recorded in the medium may be designed and configured particularly for the disclosure, or may be known and usable to those ordinarily skilled in the art.

While the disclosure has been particularly shown and described with reference to exemplary embodiments thereof, it will be understood by those ordinarily skilled in the art that various modifications and changes in form and details may be made therein without departing from the spirit of the disclosure.

Therefore, the scope of the disclosure is defined not by the detailed description of the disclosure but by the appended claims, and all differences within the scope will be construed as being included in the disclosure.

What is claimed is:

1. An electronic device comprising:
a display; and
a processor electrically connected with the display, and wherein the processor is configured to:
 display a first execution screen of a first application on an entire area of the display, wherein the first application is a map application, and wherein the first execution screen includes a map showing a designated location,
 in response to a first user input to the first execution screen of the first application displayed on the entire area of the display:
  divide the entire area of the display into a first area and a second area,
  display the first execution screen of the first application on the first area of the display, and
  display objects for executing functions provided by the first application on the second area of the display, wherein the objects include a first object for representing a search history screen, and wherein the second area is located at a lower end of the first area and/or an upper end of the first area and shares a first edge with the first area,
 in response to a second user input to the first object:
  divide the first area into a plurality of areas,
  identify a third area sharing the first edge with the second area among the plurality of areas,
  display the search history screen of routes between locations within the third area of the display, and
  display icons of a plurality of social network service (SNS) applications on the second area by replacing the objects displayed on the second area,
 identify a third user input for selecting a first icon of a first SNS application among the icons of the plurality of SNS applications,
 in response to the third user input, share the search history screen to an external device through the first SNS application, and
 display the second area as a blank area during a determined time before displaying the objects on the second area.

2. The electronic device of claim 1, wherein the objects include at least one of icons, labels or names indicating the first application.

3. The electronic device of claim 1, wherein the processor is configured to determine a position that the second area is displayed based on a user configuration.

4. The electronic device of claim 1, wherein, in response to a fourth user input to the second area located at a first position of the display, the processor is configured to move the second area from the first position of the display to a second position of the display.

5. The electronic device of claim 1, wherein the processor is configured to control the second area to be located at one of an upper end and lower end of the display.

6. The electronic device of claim 1, wherein the second area includes:
a first sub-area which is located at the lower end of the first area, and
a second sub-area which is located at the upper end of the first area.

7. The electronic device of claim 1, wherein the processor is configured to:
display an additional image on the first area and the second area, the additional image corresponding to the objects displayed on the second area,
output a sound corresponding to the objects displayed on the second area, and perform a vibration of the electronic device, the vibration corresponding to the objects displayed on the second area.

8. The electronic device of claim 1, wherein, before the first user input to the first execution screen of the first application, the processor is configured to:
identify a touch input to a setting icon for activating a function of dividing the display of the electronic device, and
in response to identifying the touch input to the setting icon, activate the function of dividing the display of the electronic device.

9. A method of an electronic device, comprising:
displaying a first execution screen of a first application on an entire area of a display, wherein the first application is a map application, and wherein the first execution screen includes a map showing a designated location;
in response to a first user input to the first execution screen of the first application displayed on the entire area of the display:
dividing the entire area of the display into a first area and a second area,
displaying the first execution screen of the first application on the first area of the display; and
displaying objects for executing functions provided by the first application on the second area of the display, wherein the objects include a first object for representing a search history screen, and wherein the second area is located at a lower end of the first area and/or an upper end of the first area and shares a first edge with the first area, in response to a second user input to the first object:
dividing the first area into a plurality of areas,
identifying a third area sharing the first edge with the second area among the plurality of areas,
displaying the search history screen of routes between locations within the third area of the display, and
displaying icons of a plurality of social network service (SNS) applications on the second area by replacing the objects displayed on the second area,
identifying a third user input for selecting a first icon of a first SNS application among the icons of the plurality of SNS applications,
in response to the third user input, sharing the search history screen to an external device through the first SNS application, and
displaying the second area as blank area during a determined time before displaying the objects on the second area.

10. The method of claim 9, wherein the objects include at least one of icons, labels or names indicating the first application.

11. The method of claim 9, further comprising:
determining a position that the second area is displayed based on a user configuration.

12. The method of claim 9, further comprising:
in response to a fourth user input to the second area located at a first position of the display, moving the second area from the first position of the display to a second position of the display.

13. The method of claim 9, further comprising:
providing an additional function including displaying multi-media contents on the display, outputting audio through a speaker, and/or vibrating the electronic device.

14. An electronic device comprising:
a display; and
a processor electrically connected with the display, and wherein the processor is configured to:
display a first execution screen of a first application supporting a map function on an entire area of the display, wherein the first execution screen includes a map showing a designated location,
in response to a first user input to the first execution screen of the first application displayed on the entire area of the display:
divide the entire area of the display into a first area and a second area,
display the first execution screen of the first application on the first area of the display, and
display objects for executing functions provided by the first application on the second area of the display, wherein the objects include a first object for representing a search history screen, and wherein the second area is located at a lower end of the first area and shares a first edge with the first area, in response to a second user input to the first object:
divide the first area into a plurality of areas,
identify a third area sharing the first edge with the second area among the plurality of areas,
display the search history screen of routes between locations within the third area of the display, and
replace the objects on the second area with icons of a plurality of social network service (SNS) applications,
identify a third user input for selecting a first icon of a first SNS application among the icons of the plurality of SNS applications,
in response to the third user input, share the search history screen to an external device through the first SNS application, and
display the second area as a blank area during a determined time before displaying the objects on the second area.

* * * * *